United States Patent
Takase et al.

(10) Patent No.: US 6,587,644 B2
(45) Date of Patent: Jul. 1, 2003

(54) FINDER UNIT

(75) Inventors: Masami Takase, Hino (JP); Yukihiko Sugita, Kokubunji (JP); Shinya Takahashi, Happy Valley (HK); Shigeru Kato, Tachikawa (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/131,893

(22) Filed: Apr. 25, 2002

(65) Prior Publication Data

US 2002/0122667 A1 Sep. 5, 2002

Related U.S. Application Data

(62) Division of application No. 09/736,808, filed on Dec. 14, 2000.

(30) Foreign Application Priority Data

Dec. 17, 1999 (JP) ............................................ 11-359500
Dec. 17, 1999 (JP) ............................................ 11-359501
Dec. 17, 1999 (JP) ............................................ 11-359502
Dec. 17, 1999 (JP) ............................................ 11-359503

(51) Int. Cl.[7] ......................... G03B 13/14; G03B 7/099; G03B 17/20; G03B 13/06; G03B 13/08
(52) U.S. Cl. ...................... 396/149; 396/271; 396/296; 396/382; 396/386; 396/377
(58) Field of Search ................................ 396/148, 271, 396/296, 373, 382, 384, 385, 386, 149, 377; 359/643, 432

(56) References Cited

U.S. PATENT DOCUMENTS

RE36,018 E    12/1998   Abe et al.
6,058,273 A    5/2000   Abe
6,088,545 A    7/2000   Abe et al.

FOREIGN PATENT DOCUMENTS

JP    10-010440    1/1998
JP    10-307315    11/1998

*Primary Examiner*—Russell Adams
*Assistant Examiner*—Rochelle Ann J Blackman
(74) *Attorney, Agent, or Firm*—Frishauf, Holtz, Goodman & Chick, P.C.

(57) ABSTRACT

A finder unit includes an objective optical system for forming a viewing image, an inverting optical system for making the viewing image formed by the objective optical system an erecting normal image, an eyepiece optical system for viewing the viewing image, a first optical component deployed closer to the objective optical system than the viewing image formation position, and a second optical component deployed closer to the eyepiece optical system than the viewing image formation position; and satisfies the condition $$8 < 1000 \times (D1+D2)/f_2(1/m)$$

when the focal length of the eyepiece optical system is represented as f (mm), the distance from the viewing image formation position to the first optical component as D1 (mm), and the distance from the viewing image formation position to the second optical component as D2 (mm).

17 Claims, 13 Drawing Sheets

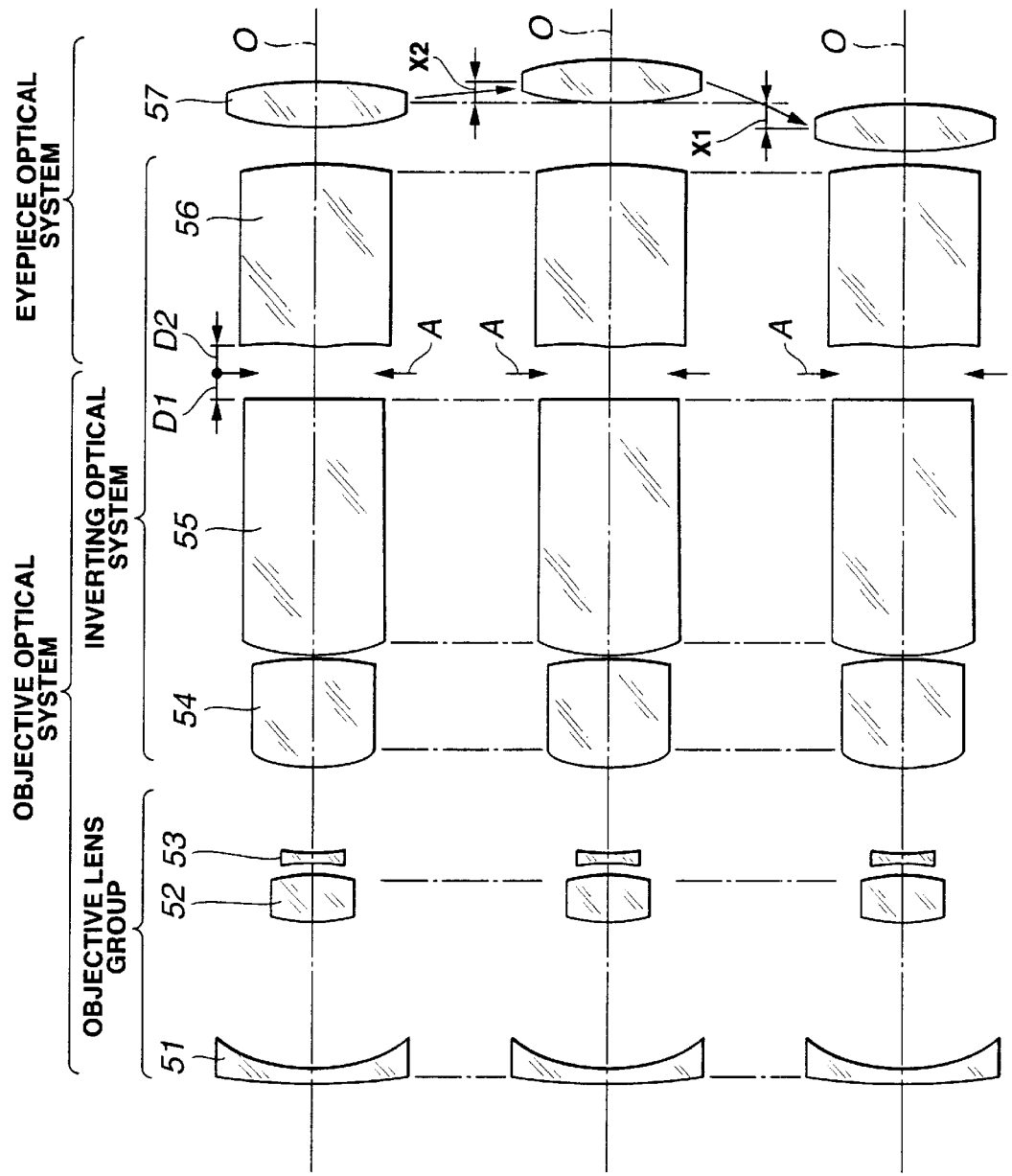
FIG.12A (AT STANDARD POSITION)
FIG.12B (AT FAR-SIGHTED POSITION)
FIG.12C (AT NEAR-SIGHTED POSITION)

FINDER UNIT

This application is a division of application Ser. No. 09/736,808 filed Dec. 14, 2000.

This application claims benefit of Japanese Applications No. H11-359500 filed on Dec. 17, 1999, No. H11-359501 filed on Dec. 17, 1999, No. H11-359502 filed on Dec. 17, 1999, and No. H11-359503 filed on Dec. 17, 1999, the contents of which are incorporated by this reference.

BACKGROUND OF THE INVENTION

1. Field of the Invention

This invention relates to a finder unit, and more particularly to a finder unit, having a finder optical system, for verifying and observing a field-of-view range containing a desired photographic image, in a camera or the like for taking pictures or the like.

2. Description of the Related Art

Various real-image type finder units have been proposed, as in Japanese Patent Application Laid-Open No. H10-10440/1998, for example, and made generally practical, which are finder units for verifying and observing a field-of-view range containing a desired viewing image, in a camera or the like for taking pictures or the like, that have a finder optical system configured by an objective optical system, inverting optical system, and eyepiece optical system, configured such that the viewing image formed by the objective optical system is made an erecting normal image by the inverting optical system, and enlarged for viewing by the eyepiece optical system.

The finder optical system of the finder unit disclosed in Japanese Patent Application Laid-Open No. H10-10440/1998 is made so that, by displacing the interval between the image formation position of the viewing image formed by the objective optical system and the condenser lens close to the eyepiece optical system by a prescribed distance (more than approximately 4 diopters (1/m)), the dust, grime, and scratches on the surface, etc., of the condenser lens and the dust and the like inside the prism will not be observed. This [finder optical system] is thus such that a good viewing image can be obtained.

Nevertheless, in the finder unit disclosed in Japanese Patent Application Laid-Open No. H10-10440/1998 (published), although it is possible to make the configuration such that dust and grime and the like adhering to the surface of the optical components (condenser lens) on the eyepiece optical system side that is in opposition to the viewing image formation position are not observed, there is no mention whatever of the similar problem in the optical components of the objective optical system in opposition to that image formation position.

Meanwhile, for conventional real-image type finder units such as described above which comprise a visibility adjustment mechanism wherewith the user of the unit can adjust the viewing visibility of the finder optical system at his or her discretion, various proposals have been made in the past, such as for means configured so that the viewing visibility can be altered by moving at least one optical component (specifically, the eyepiece lens, etc., configuring part of the eyepiece optical system) of the finder optical system, and these have been made generally practical.

However, when consideration is given to employing, in the finder optical system of the finder unit disclosed in Japanese Patent Application Laid-Open No. H10-10440/1998 (published), noted earlier, a visibility adjustment mechanism wherewith the viewing visibility is adjusted by moving the eyepiece lens, the problems discussed below are encountered.

That is, in the finder optical system of the finder unit disclosed in Japanese Patent Application Laid-Open No. H10-10440/1998 (published), the arrangement of the [configuring] members is set so that the interval between the image formation position for the viewing image formed by the objective optical system and the condenser lens close to the eyepiece optical system is displaced a prescribed distance.

In the finder unit of Japanese Patent Application Laid-Open No. H10-10440/1998 (published) noted above, when the configuration is made so that the interval between the image formation position of the viewing image and the condenser lens is displaced by approximately 4 diopters (1/m), it is possible to view a viewing image that is appropriate to a person with normal vision. However, when used in this condition by a near-sighted or far-sighted person, it is not possible to view an appropriate viewing image.

That being so, consideration is given to providing a visibility adjustment mechanism wherewith appropriate viewing images can be viewed with the same unit by various individuals having respectively different visual acuity. Then, when this is used to move the eyepiece lens of the finder optical system in the direction of the optical axis of the finder optical system, by prescribed means, it becomes possible to adjust the viewing visibility. Thereupon, when a far-sighted person, for example, has used the visibility adjustment mechanism to adjust the viewing visibility so as to be appropriate for himself or herself, the eyepiece lens will be set in a position that is distanced from the viewing image as compared to the position at which a person of normal vision views. Accordingly, should a person of normal vision view a viewing image in this condition, as is, without making a readjustment, it is possible that he or she would be able to observe the dust and grime, etc., adhering to the surface, etc., of the condenser lens.

In other words, there is a problem in that, even when the means disclosed in Japanese Patent Application Laid-Open No. H10-10440/1998 (published) are augmented by a visibility adjustment mechanism, there is no guarantee that it will always be possible to obtain a good viewing image.

Other conventional real-image type finder units are also disclosed, as, for example, in Japanese Patent Application Laid-Open No. H10-307315/1998 (published).

The finder unit disclosed in Japanese Patent Application Laid-Open No. H10-307315/1998 (published) is a so-called bright-frame-finder unit that is configured by a plurality of optical elements, wherein, by deploying a translucent reflecting surface at a prescribed position in the light path of the finder optical system, means for displaying various kinds of information relating to photographing that are superimposed on the viewing image of a desired photographic subject, such as, for example, field of view frame information for-defining the field of view constituting the photographic range, or field of view information for displaying camera settings and operating conditions and the like in a form that can be visually distinguished (hereinafter called in-finder display), are deployed separately from the finder optical system.

In the configuration of the finder unit disclosed in the publication just cited, furthermore, light measuring means for performing light measuring operations for automatically setting the exposure are provided, and light flux division means are provided for making it possible to guide the light flux guided into the interior of the finder unit for those light measuring means and for the means for making the in-finder display described above, respectively. Thus it becomes possible, while viewing the viewing image of the photographic subject, to execute a prescribed light measuring operation using light flux equivalent to the light flux forming that viewing image and to set the exposure at the time of the shooting.

In general, in a bright-frame-finder unit, a display panel is used as means for effecting various kinds of displays in the finder, but this display panel must be deployed at a position that is substantially optically equivalent relative to the positional relationship between the eyepiece optical system and the image formation position of the viewing image formed by the objective optical system.

Based on the means disclosed in Japanese Patent Application Laid-Open No. H10-307315/1998 (published) noted earlier, however, in view of the fact that the configuration is such that there is a plurality of reflecting surfaces between the eyepiece optical system and the image formation position of the viewing image formed by the objective optical system, it is necessary to secure a long distance between the eyepiece optical system and the viewing image formation position. Accordingly, the distance between the eyepiece optical system and the display panel (a liquid crystal display panel in the finder unit disclosed in Japanese Patent Application Laid-Open No. H10-307315/1998 (published)) to be deployed at a position that is substantially optically equivalent relative to the distance between the eyepiece optical system and the viewing image formation position must of necessity be an equivalently long distance. Accordingly, with the means disclosed in Japanese Patent Application Laid-Open No. H10-307315/1998 (published), the finder unit itself becomes large, which is a problem.

Moreover, in order to make it easy to view the viewing image formed by the objective optical system, in a conventional finder unit, the finder magnification power is sometimes set high. For that purpose, various means are ordinarily employed, such as the means of configuring each of the optical elements themselves that configure the finder optical system of large elements, for example, or innovative means of deploying the eyepiece optical system so that the focal length of the eyepiece optical system, that is, the distance between the eyepiece optical system and the viewing image formation position, becomes short.

However, when each of the optical elements themselves becomes large, as in the former case, the finder unit that is configured thereby will itself also become large, wherefore such cannot be called desirable means.

And when the focal length of the eyepiece optical system is made short, as with the latter means, restrictions are imposed when forming the inverting optical system, wherefore there are limitations in making the focal length of the eyepiece optical system short, which is a problem.

In the finder units employed in conventional cameras and the like, furthermore, units have been practically implemented which are configured such that it is possible to view, simultaneously with the viewing image, various kinds of information and the like relating to the photographic shooting, such as field of view frame information for defining the field of view constituting the photographic range, for example, or various kinds of information relating to the photographic shooting for displaying camera settings and operational conditions and the like in such form that they can be visually distinguished (hereinafter called in-finder display). In such cases, in order that the viewing image and the various kinds of photographic shooting information (in-finder display) can be viewed simultaneously, means can be conceived for deploying the display means for displaying the in-finder display of the various kinds of photographic information and the like in the vicinity of the viewing image formation position.

However, when, in the finder unit disclosed in Japanese Patent Application Laid-Open No. H10-10440/1998 (published), the display means for the in-finder display are deployed in the vicinity of the image formation position, it is conceivable that the dust and grime, etc., adhering to the surface, etc., of those display means will be clearly observed.

Thereupon, various means for making it possible to simultaneously view the viewing image and the in-finder display, deploying the display means at a position that is substantially optically equivalent to the image formation position, without deploying the display means in the vicinity of the viewing image formation position, have been proposed, as in Japanese Patent Application Laid-Open No. H10-307315/1998 (published), for example, and made practical.

In Japanese Patent Application Laid-Open No. H10-307315/1998 (published) is disclosed a so-called bright-frame-finder unit that is formed by a plurality of optical elements, as described earlier, configured such that, by deploying a translucent reflecting surface in the light path of the finder optical system, means for displaying various kinds of photographic information and the like superimposed on the viewing image of the desired photographic subject are deployed separately from the finder optical system.

However, the means disclosed in Japanese Patent Application Laid-Open No. H10-307315/1998 (published) are configured such that the prescribed display means are illuminated, receiving only the natural light inducted into the interior of the finder unit from the light-intaking window. Accordingly, when using a finder unit employing those means, there is a problem in that it becomes very difficult to view the in-finder display when the brightness of the surrounding environment is low.

Furthermore, in Japanese Patent Application Laid-Open No. H10-307315/1998 (published), no problems are pointed out and no resolving measures or the like are mentioned whatsoever concerning the possibility of dust and grime, etc., adhering to the surface of a lens deployed in the vicinity of the viewing image formation position being viewed.

The present invention was devised with the points described in the foregoing in view.

SUMMARY OF THE INVENTION

A first object of the present invention is to provide a real-image type finder unit wherewith the desired viewing image can always be viewed in a favorable condition and wherewith also smaller size can be realized.

A second object of the present invention is to provide a real-image type finder unit wherewith, even when a visibility adjustment mechanism is comprised, the viewing image can always be viewed in a favorable condition.

A third object of the present invention is to provide a real-image type finder unit having a light-intaking window, wherewith, by innovatively situating the translucent reflecting surface deployed in the interior of the inverting optical system configuring part of the finder optical system, and setting the focal length of the eyepiece optical system so that it is shorter, it is possible both to secure the necessary finder magnification power, and to contribute to the miniaturization of the unit itself by making the finder optical system smaller.

A fourth object of the present invention is to provide a finder unit wherewith it is possible to view an in-finder display of various kinds of photographic information and the like simultaneously with the viewing image containing the desired photographic subject, wherein provision is made so that dust and grime, etc., adhering to the surface, etc., of the optical elements (lenses, etc.) deployed in the vicinity of the viewing image formation position are not viewed, such that a good viewing image can be obtained, wherewith clear viewing of the in-finder display is rendered easy even in low brightness conditions.

Described simply, a first invention is a finder unit including an objective optical system for forming a viewing image, an inverting optical system for making the viewing image formed by the objective optical system an erecting normal image, an eyepiece optical system for viewing the viewing image, a first optical component deployed more toward the side of the objective optical system from the viewing image formation position, and a second optical component deployed more toward the side of the eyepiece optical system from the viewing image formation position, wherein, when the focal length of the eyepiece optical system is represented as f (mm), the distance from the viewing image formation position to the first optical component as D1 (mm), and the distance from the viewing image formation position to the second optical component as D2 (mm), the condition $$8 < 1000 \times (D1+D2)/f^2 \, (1/m)$$

is satisfied.

A second invention is a finder unit including an objective optical system for forming a viewing image, an inverting optical system for making the viewing image formed by the objective optical system an erecting normal image, an eyepiece optical system for viewing the viewing image, a visibility adjustment mechanism for adjusting the viewing visibility for the viewing image within a prescribed range, a first optical component deployed more toward the side of the objective optical system from the viewing image formation position, and a second optical component deployed more toward the side of the eyepiece optical system from the viewing image formation position, wherein, when the focal length of the eyepiece optical system is represented as f (mm), the distance from the viewing image formation position to the first optical component as D1 (mm), the distance from the viewing image formation position to the second optical component as D2 (mm), the amount of adjustment of the visibility adjustment means toward the visibility minus side as X1 (1/m), and the amount of adjustment of the visibility adjustment means toward the visibility plus side as X2 (1/m), the conditions $$4+X1 < 1000 \times D1/f^2,$$

and $$4+X2 < 1000 \times D2/f^2$$

are both satisfied.

These and other objects and benefits of the present invention will be made even clearer by the following detailed description.

Based on the present invention, a real-image type finder unit can be provided wherewith a desired viewing object can always be viewed in a favorable condition and smaller size can be realized.

Based on the present invention, moreover, an real-image type finder unit can be provided wherewith, even when equipped with a visibility adjustment mechanism, a desired viewing object can always be viewed in a favorable condition.

In addition, based on the present invention, a real-image type finder unit that has a light-intaking window can be provided wherewith, by innovatively situating a translucent reflective surface deployed in the interior of the inverting optical system configuring part of the finder optical system and making the focal length of the eyepiece optical system shorter, it is possible to secure the necessary finder magnification power and, also, by making the finder optical system smaller, to contribute to making the unit itself smaller.

Based on the present invention, furthermore, a finder unit is provided wherewith it is possible to view an in-finder display of various kinds of photographic information, etc., simultaneously with the viewing image containing the desired photographic subject, made so that dust and grime and the like adhering to the surface, etc., of the optical element (lenses, etc.) deployed in the vicinity of the viewing image formation position are not viewed, such that a good viewing image can be obtained, wherewith also the clear viewing of the in-finder display is rendered easy even under low brightness conditions.

BRIEF DESCRIPTION OF THE DRAWINGS

FIGS. 12A, 12B, and 12C are diagrams representing the main configuration of the finder unit in the second embodiment of the present invention, being expanded optical system views that show the finder optical system in this finder unit expanded, and being diagrams that particularly represent the deployment of the eyepiece optical system in a prescribed visibility position;

DESCRIPTION OF THE PREFERRED EMBODIMENTS

The finder unit of the present invention is a unit that is used in a camera for taking photographs, for example, and that, when taking photographs, etc., verifies the field of view in the shooting range inclusive of a desired photographic subject and verifies a viewing image or the like of the photographic subject. In the embodiment described below, examples are given wherein the finder unit of the present invention is employed in a camera.

Figure 1:
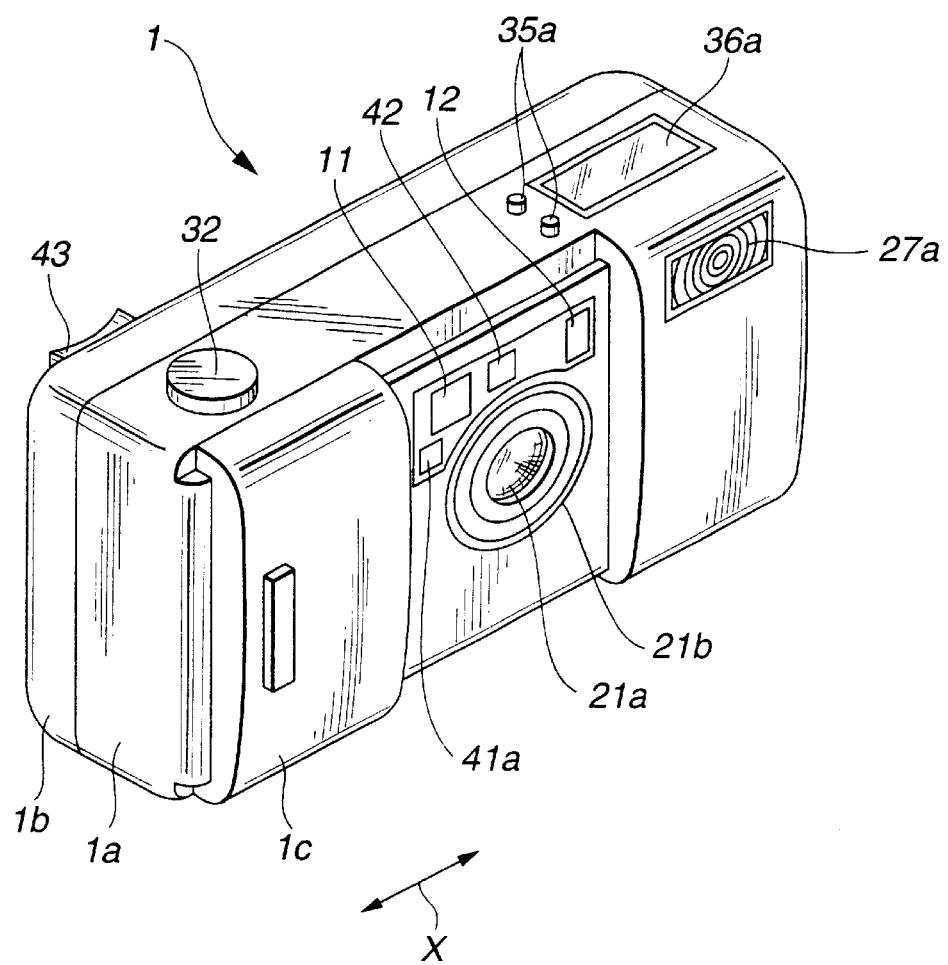
FIG. 1 is a diagonal view depicting the exterior appearance of the front side of a camera wherein a finder unit in a first embodiment of the present invention is employed.
Figure 2:
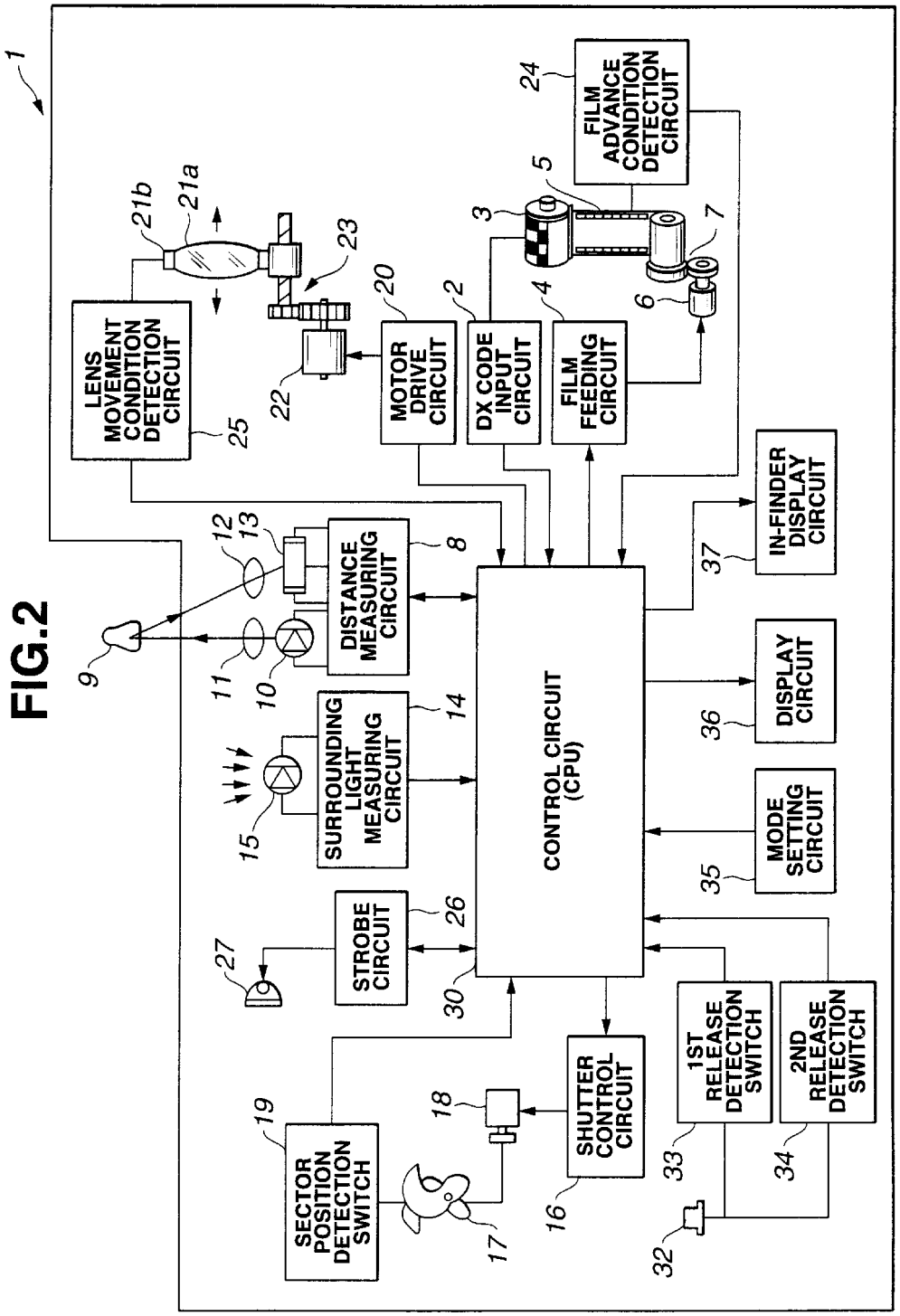
FIG. 2 is a block configuration view of critical components representing the internal configuration of a camera wherein the finder unit in the first embodiment of the present invention is employed.

FIG. 1 and FIG. 2 represent a camera wherein the finder unit in a first embodiment of the present invention is employed. FIG. 1 is a diagonal view depicting the external appearance of the front side of the camera. FIG. 2 is a block configuration diagram of main parts representing the internal configuration of the camera.

The main body and the various types of configuring members of the camera 1 in this embodiment are covered by an exterior case member formed by a front cover 1a, a rear cover 1b, and a barrier member 1c that is deployed so that it freely slides in a direction extending along the front surface of the front cover, that is, in a direction perpendicular to the optical axis of a photographic shooting optical system 21a (described subsequently), etc.

On the circumferential surface of the outer members of this camera 1 are deployed various kinds of operate members, etc., and some of the various kinds of configuring members deployed internally are deployed at prescribed positions so that they are exposed to the outside. Deployed on the upper surface of this camera, for example, are such operate members as a release button 32 that is a operate member manipulated when beginning a photographic shooting action and a plurality of mode switching operate buttons 35a that are operate members for effecting various setting operations such as settings and the like related to shooting mode and to internal clock settings and strobe functions, and an information display member 36a, comprising a liquid crystal display device (LCD) for displaying pictures and text etc. in prescribed forms so that shooting mode information, date and time information, and camera condition information and the like can be visually recognized.

On the front surface of this camera 1 is deployed a strobe emitting window 27a that protects the front surface of a strobe emitter 27 (cf. FIG. 2) at a prescribed position near one upper side edge and that irradiates a prescribed range containing the photographic subject toward the front of the camera 1 with flashes from the emitter 27.

A photographic shooting optical system 21a for forming images of the photographic subject on the exposure surface of roll film 5 (cf. FIG. 2) deployed inside the camera 1, transmitting subject light flux contributing to the taking of the photograph, is deployed more or less in the center of the front surface of the camera 1, held in a lens barrel 21b.

Figure 3:
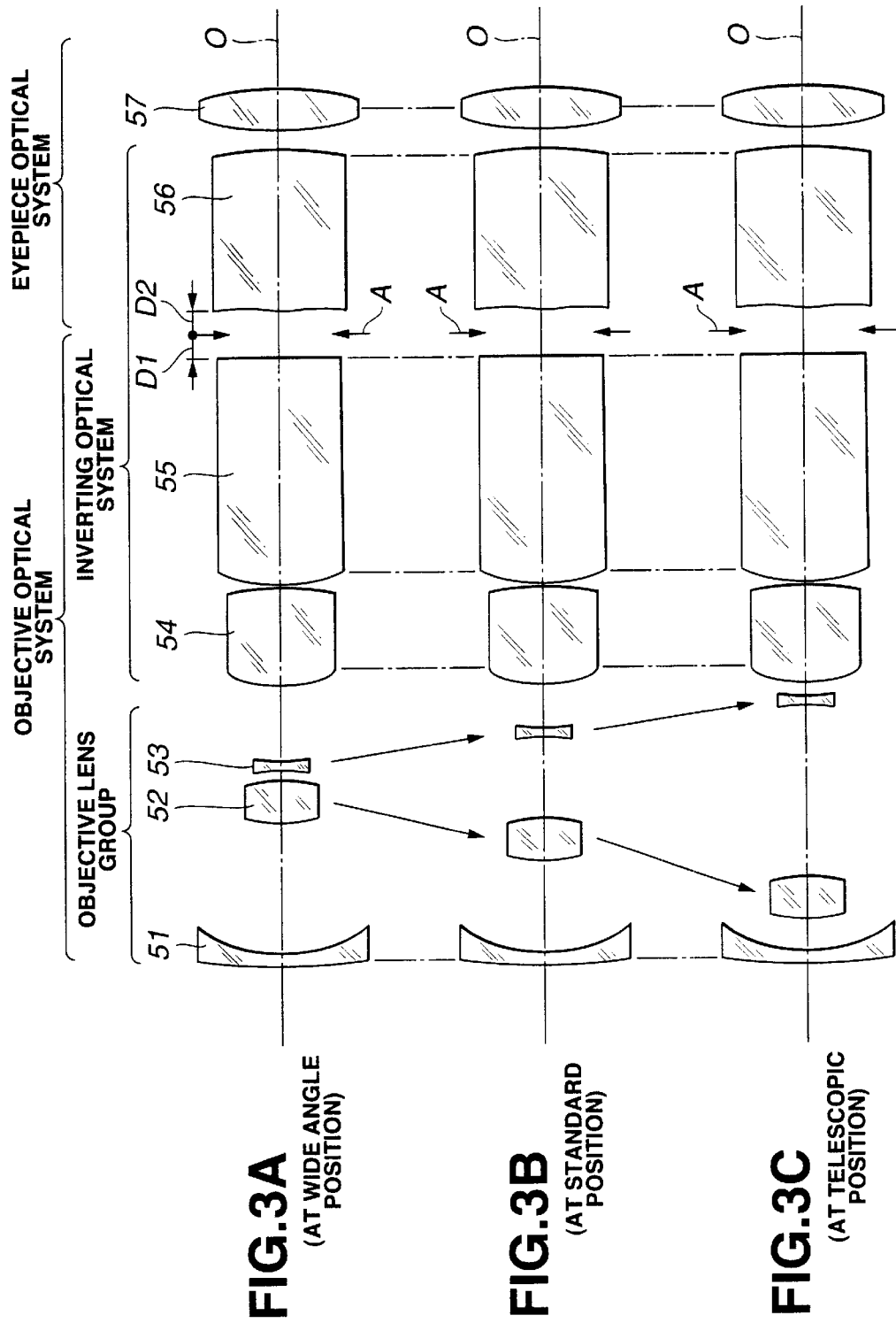
FIGS. 3A, 3B, and 3C are diagrams representing the main configuration of the finder unit in the first embodiment of the present invention, being an expanded optical system view that shows the finder optical system in this finder unit expanded.

In a prescribed position near the upper edge of the exterior case member of the camera 1 that is a circumferential edge of the photographic shooting optical system 21a are deployed a light projecting lens 11 and light receiving lens 12 that configure part of a distance measuring device (the configuration of which is described in detail subsequently) that contributes to the distance measuring operation, a finder window 41a that covers and protects the front surface of an objective optical system that configures part of the finder unit of this embodiment aspect, and a light-intaking window 42 constituting natural light illumination means which are illumination means for intaking natural light for the interior of the finder unit, etc. (The finder optical system in this finder unit is described subsequently. Cf. FIGS. 3A, 3B, and 3C, etc.) Also, on the back side of the camera 1, at a prescribed position near the upper edge at one end, is deployed a zoom lever 43 that is operated when performing magnification changing operations on the photographic shooting optical system 21a, etc.

Also, the barrier member 1c is deployed so that it freely slides in the directions indicated by the arrow X in FIG. 1 relative to the front cover 1a. That is, the configuration is such that, by the barrier member 1c being moved in a prescribed direction, a closed condition, wherein the front surfaces of the main members deployed on the front surface of the camera 1, such as the photographic shooting optical system 21a, the lens barrel 21b, the finder window 41a, the light projection lens 11, the light receiving lens 12, and the light-intaking window 42, etc., for example, are covered and protected by the barrier member 1c, and an open condition, wherein the front surfaces of these members are exposed to the outside so that photograph shooting operations can be performed, are changed between. In the condition diagrammed in FIG. 1, the barrier member 1c is depicted in the open condition.

The camera 1 is also configured by various kinds of configuring members and various kinds of electric circuits and the like deployed inside the main body, as diagrammed in FIG. 2.

In the interior of the main body of the camera 1 of this embodiment, a control circuit 30 configured by a CPU, constituting control means for performing the overall control of the camera 1, etc., is deployed. To this control circuit 30 are connected various kinds of circuits, either directly or indirectly through various kinds of configuring circuits, etc.

More specifically, to the control circuit 30 are electrically connected, either directly or indirectly, respectively, a DX code input circuit 2 for reading in film information and the like such as the film ISO sensitivity, etc., for example, from DX code or the like on a film cartridge 3 wherein film 5 is wound and stored, a film feeding circuit 4 for controlling the drive of a film advance mechanism 7 through a film advance motor 6 for advancing the film 5 coming from the cartridge 3, a film advance condition detection circuit 24 for detecting the perforations or the like in the film 5 during film advance actions by the film feeding circuit 4 and detecting the amount of the movement thereof, a distance measuring circuit 8 configuring part of a distance measuring device constituting distance measuring means for measuring the distance to the main photographic subject 9 position substantially in the center of the photographic screen, a surrounding light measuring circuit 14 configuring light measuring means formed by a light measuring sensor 15, etc., for measuring the brightness, etc., of the subject field containing the photographic subject 9, a shutter control circuit 16 for controlling the drive of a plunger 18 that is a drive mechanism for performing actions to open and close a sector shutter 17 made up of shutter vanes that serve also as an aperture diaphragm for opening and closing an opening for making exposures, a sector position detection switch 19 for detecting the position of the sector shutter 17, a motor drive circuit 20 for controlling the drive of a drive motor 22 that moves a focus adjusting lens that is part of the photographic shooting optical system 21a held inside the lens barrel 21b, in directions extending along the optical axis, via a focus drive mechanism 23, based on the photographic subject distance information, etc., obtained by the distance measuring circuit 8, a lens movement condition detection circuit 25 for detecting the condition of movement of the focus adjustment lens from a reference position, a strobe circuit 26 for controlling emissions of a strobe unit containing the strobe emitter 27 formed by a reflector and xenon (Xe) tube, etc., and charging the same, a first (1st) release detection switch 33 and a second (2nd) release detection switch 34 that respond to the operation state of the release button 32 deployed on the upper surface of the camera 1, that is, to a first-stage on condition (half-depressed condition) and to a second-stage on condition (fully depressed condition), a mode setting circuit 35 for setting operating modes for the camera 1 in response to manipulations of the plurality of mode switching control buttons 35a (cf. FIG. 1), a display circuit 36 for controlling the drive of the information display member 36a (cf. FIG. 1), and an in-finder display circuit 37 for controlling a display (described in detail subsequently) in the field of view range of the finder unit, etc.

When the film cartridge 3 is loaded into the camera 1, the DX code input circuit 2 is configured so that it reads in film information, etc., such as the film ISO sensitivity and the like from DX code or the like provided by printing, for example, at a prescribed position on the outer circumferential surface of the cartridge 3.

The distance measuring circuit 8, as noted above, configures part of the distance measuring device. This distance measuring device is configured by a light projection element 10 including a light emitting diode (LED) constituting light emitting means that are light projection means and that emit light such as infrared light flux, the light projecting lens 11 that shines the light emitted from the light projection element 10 toward a desired photographic subject, in a prescribed direction and at a prescribed time, the light receiving lens 12 that condenses reflected signal light resulting when the light flux irradiated from the light projection element 10 is reflected by the photographic subject 9, and a light receiving element 13 including a photosensing device (PSD) constituting light quantity signal means.

The operation of the distance measuring device may be simply described as follows. The distance measuring circuit 8 receives an instruction signal instructing the start of a distance measuring operation, which signal is an on signal from the 1st release detection switch 33 described above, drives the light projection element 10 to emit light, and projects infrared light flux or the like from the light projection element 10 through the light projecting lens 11 toward the photographic subject 9. The reflected signal light therefrom is condensed by the light receiving lens 12, and, via that light receiving lens 12, received by the light receiving element 13. As a result, the distance measuring circuit 8 calculates the distance to the photographic subject 9 based on the position in which the reflected signal light is received by the light receiving element 13, whereupon the distance to the desired photographic subject is calculated. The photographic subject distance data, etc., obtained here (digital values) are transmitted to, the control circuit 30, whereupon a prescribed automatic focus adjustment action is performed.

The shutter control circuit 16 is a circuit for controlling the drive of the plunger 18 and performing actions to open and close the sector shutter 17, as described earlier. The sector shutter 17 is a shutter that also serves as an aperture diaphragm having triangular opening characteristics.

More specifically, the sector shutter 17 is made so that, when the plunger 18 is driven under the control of the shutter control circuit 16, the sector opening (opening for making exposures) is gradually opened when the plunger 18 is supplied with power by an on signal from the shutter control circuit 16, while the same sector opening (opening for making exposures) is rapidly rendered in the closed condition when the same plunger 18 is supplied with power by an off signal from the shutter control circuit 16. In this case, the configuration is such that the opening time in the action of opening the sector opening (opening for making exposures) will be detected by the sector position detection switch 19.

Among the camera operating modes set by the mode setting circuit 35 are, for example, strobe photography modes. Among these strobe photography modes are, for example, modes such as an auto strobe mode that automatically causes strobe light to be emitted or disallows the emission of strobe light depending on the photographic subject brightness and other photographic conditions, a strobe off mode that forcibly disallows the emission of strobe light irrespective of the photographic subject brightness or other photographic conditions, and a daytime synchro mode for causing strobe light to be emitted discretionally depending on such photographic conditions, during daylight and outdoors, etc., as glare conditions or the photographic subject being in a shadow, etc. The camera operating modes are not limited thereto or thereby, however, and all kinds of modes are conceivable, such as a film advance action mode for causing continuous shooting actions, or a self timer mode or interval timer mode for generating a release signal automatically after a certain time has elapsed. Provision is made so that the setting of these operating modes can also be performed by the mode setting circuit 35.

The detailed configuration of the finder unit in this embodiment is next described.

FIGS. 3A, 3B, 3C, 4, 5, 6, 7, and 8 are diagrams representing the main configuration of the finder unit of this embodiment aspect. Of these, FIGS. 3A, 3B, and 3C are expanded optical system diagrams representing the finder optical system in this finder unit expanded, and conceptually representing the path by which light flux is input to the finder optical system. FIG. 3A diagrams a condition wherein the finder optical system is set in the shortest focal length on the wide-angle side, FIG. 3B a condition wherein the finder optical system is set in a standard focal length, and FIG. 3C a condition wherein the finder optical system is set in the longest focal length on the telescopic side.

Figure 4:
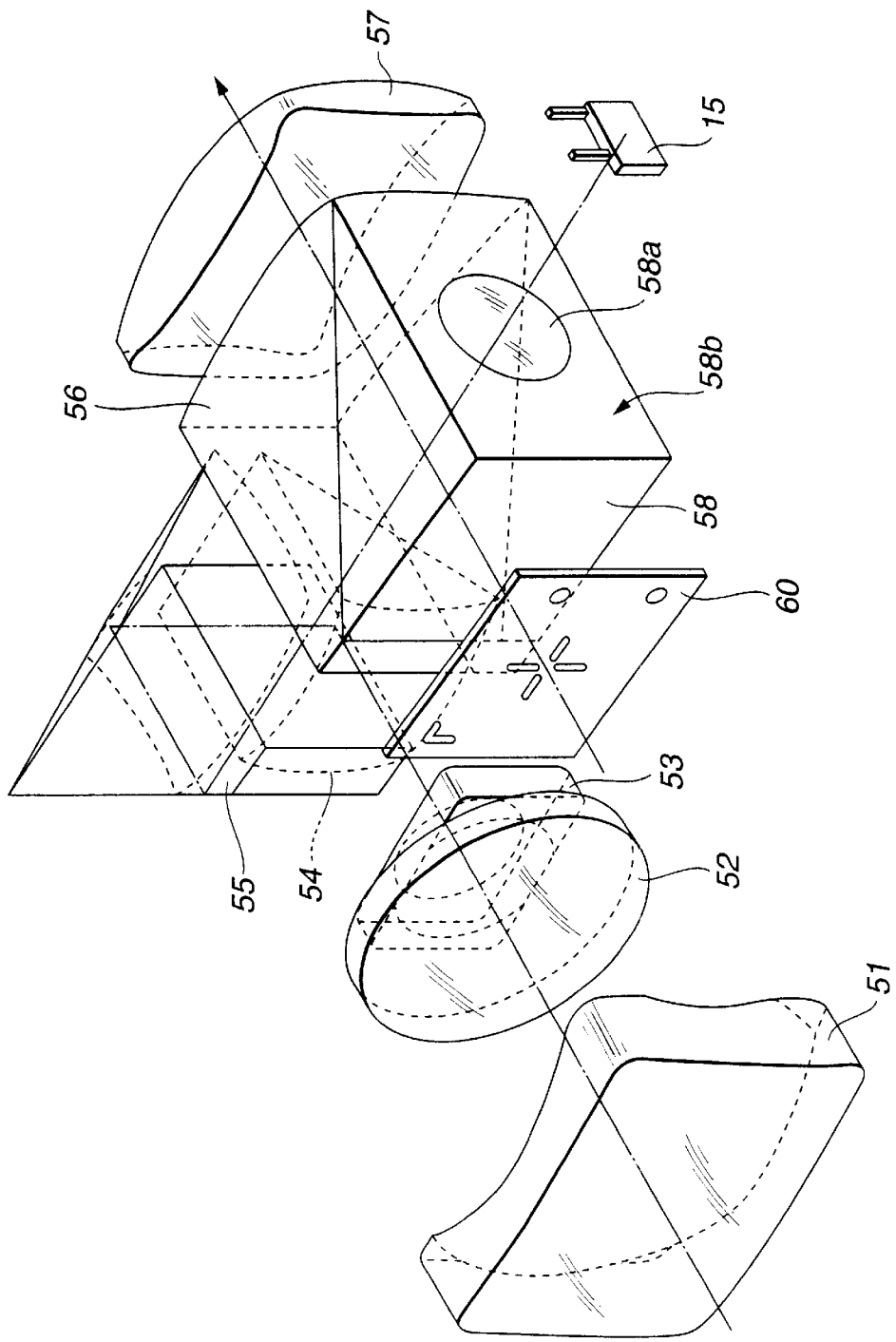
FIG. 4 provides a light path view and a diagonal view representing the deployment of configuring members in the finder unit of this embodiment, but specifically when such of those members configuring mainly the finder optical system are taken out.
Figure 5:
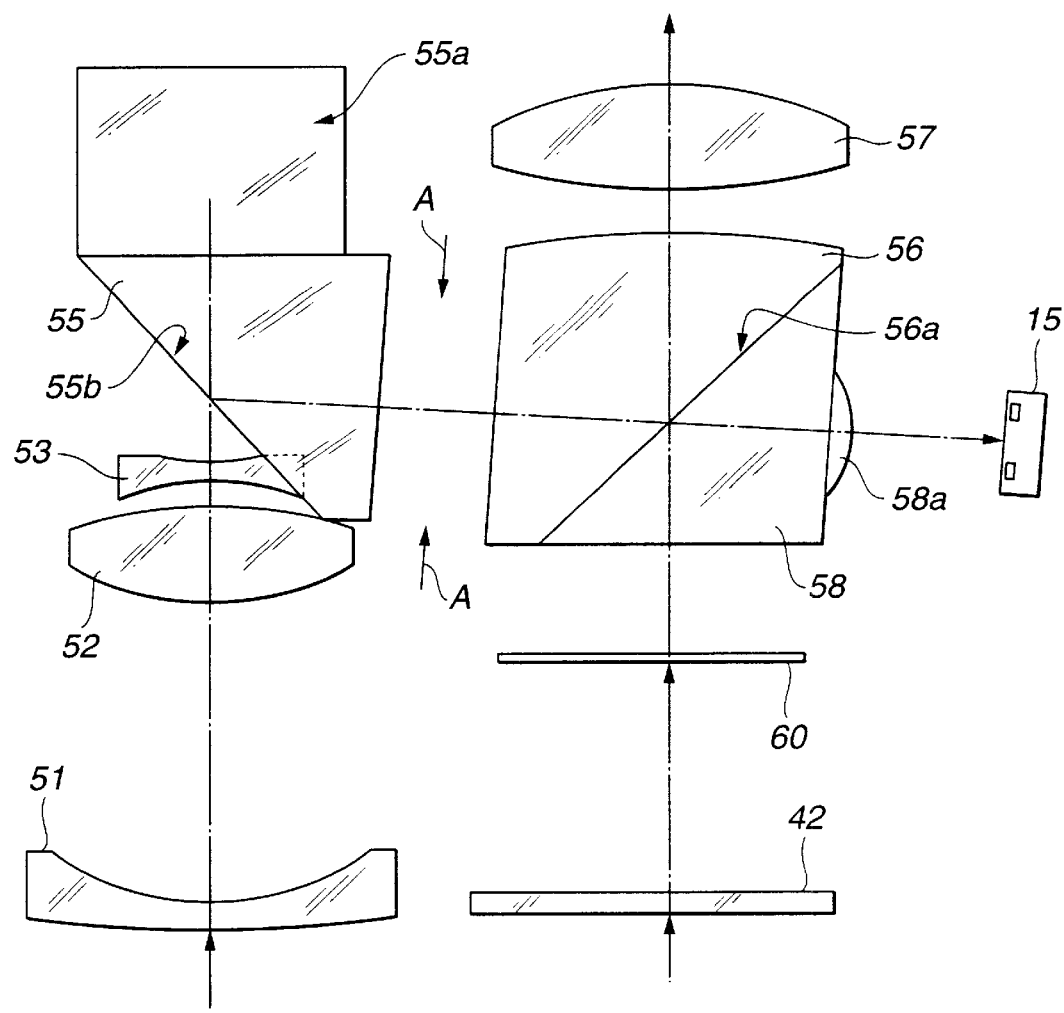
FIG. 5 provides a light path view and a top view representing the deployment of configuring members in the finder unit of this embodiment, but specifically when such of those members configuring mainly the finder optical system are taken out.
Figure 6:
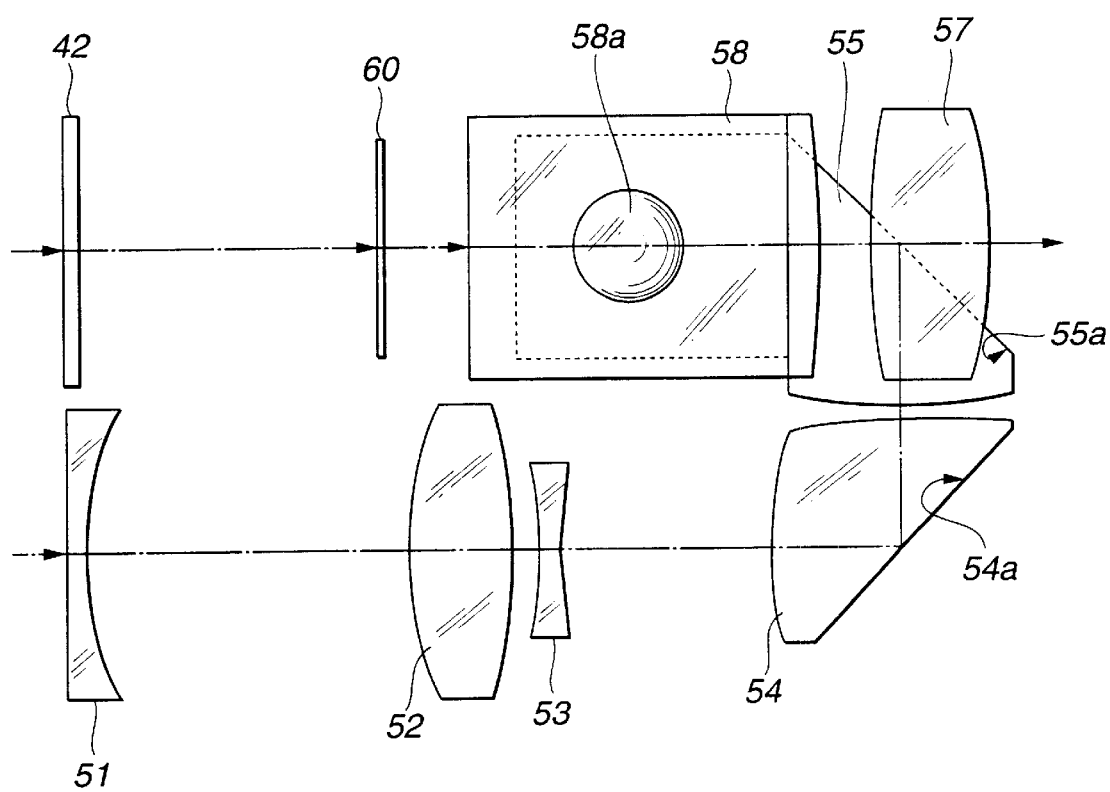
FIG. 6 provides a light path view and a side elevation representing the deployment of configuring members in the finder unit of this embodiment, but specifically when such of those members configuring mainly the finder optical system are taken out.

FIGS. 4, 5, and 6 are member deployment figures wherein, of the configuring members in this finder unit, mainly the members configuring the finder optical system are taken out. Of these diagrams, FIG. 4 represents a diagonal view, FIG. 5 a top view, and FIG. 6 a side view, respectively. FIGS. 4, 5, and 6, furthermore, in addition to representing the configuration of the finder optical system, are also light path diagrams that represent as well the light paths for the light flux input to this finder optical system. In FIGS. 3A, 3B, 3C, and 5, moreover, the symbol A indicates the image formation position for the viewing image produced by the objective optical system.

Figure 7:
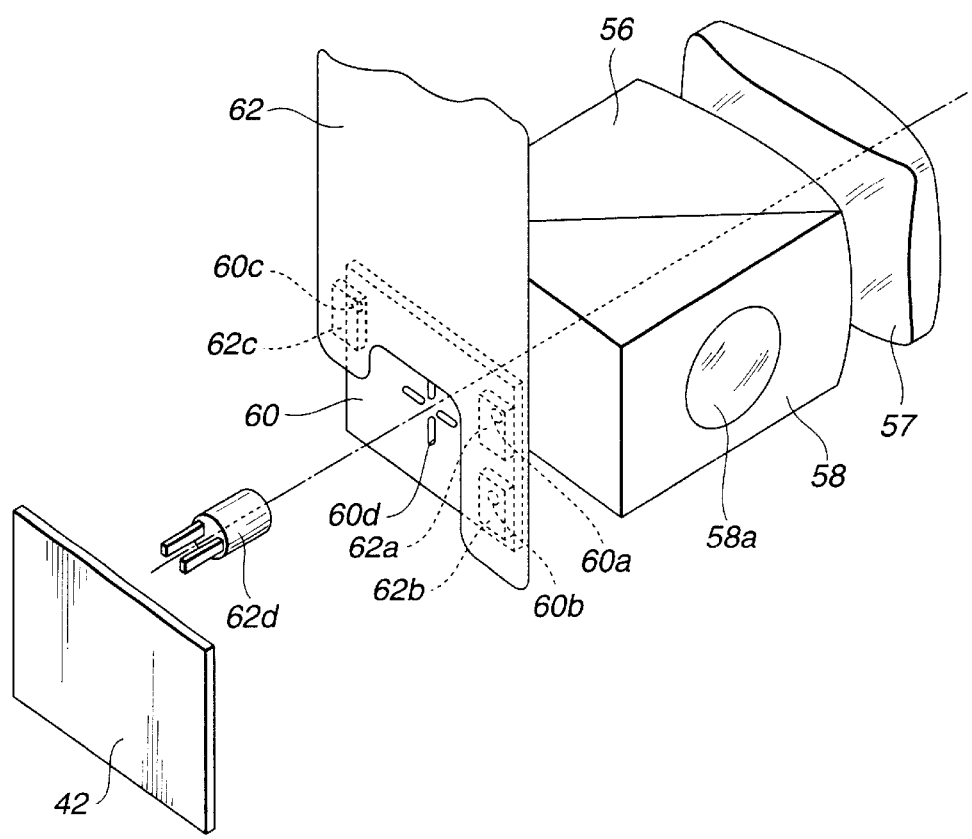
FIG. 7 is a diagonal view of essential components representing those members in the vicinity of the eyepiece optical system taken out from the configuring members of the finder unit in this embodiment.
Figure 8:
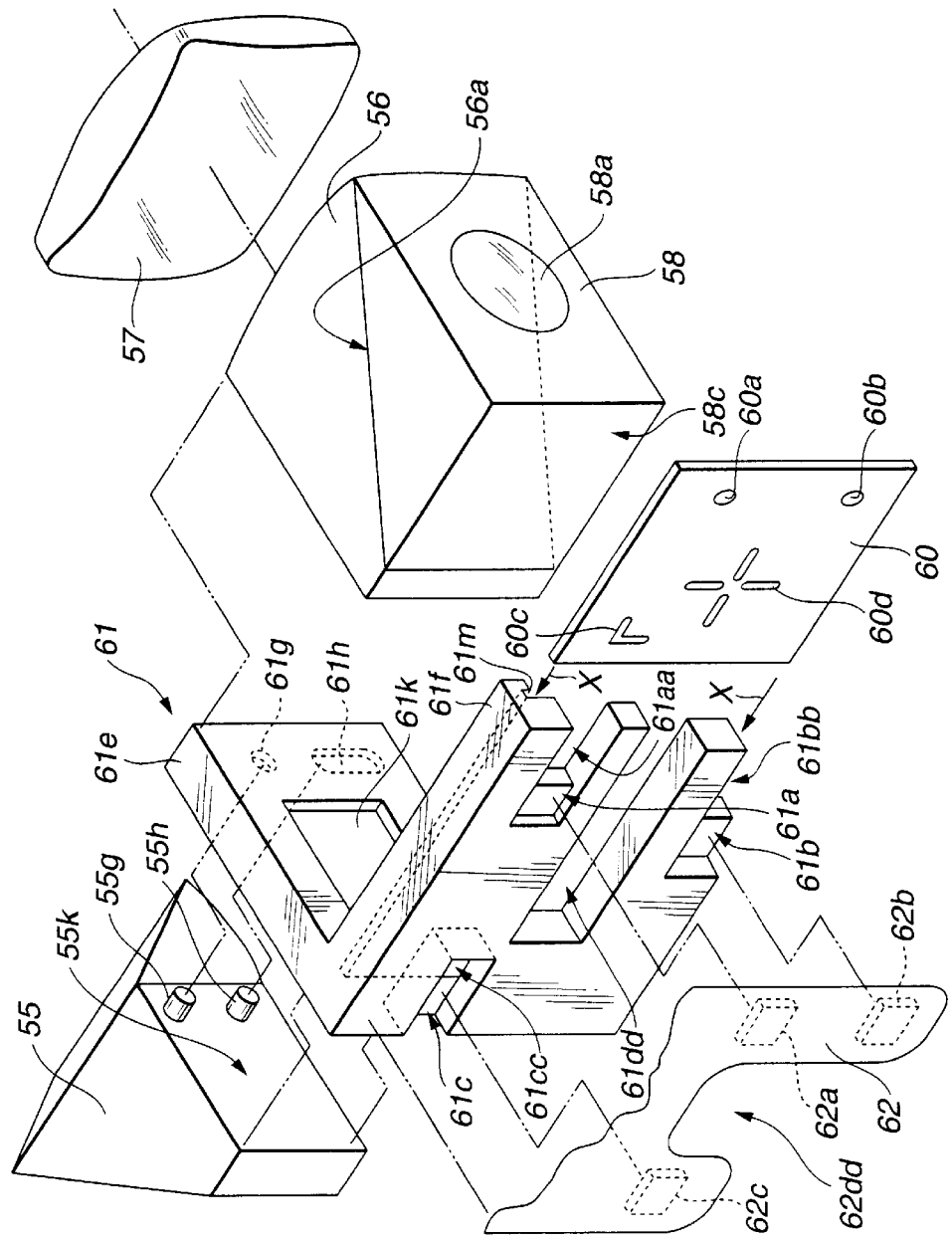
FIG. 8 is a diagonal view of essential components representing the configuration in the vicinity of the finder field of view frame taken out from the configuring members of the finder unit in this embodiment.

FIG. 7 and FIG. 8 are diagonal views of essential parts representing some of the configuring members of this finder unit taken out. FIG. 7 represents the configuration in the vicinity of the eyepiece optical system, while FIG. 8 represents the configuration in the vicinity of the finder field of view frame.

The finder optical system in the finder unit in this embodiment is configured by an objective optical system formed by a multiple objective lens group and one part of an inverting optical system, as diagrammed in FIG. 3A, 3B, and 3C, and an eyepiece optical system formed by the other part of the inverting optical system and an eyepiece lens 57.

The objective lens group, which is a unit for receiving light flux from the photographic subject and forming a viewing image, is configured by a plurality of optical elements (lenses). More specifically, it is formed by a first lens 51 that is fixed in a prescribed position on the front side of the main body of the camera 1, and by a second lens 52 and third lens 53 deployed so that they move freely in the optical axis direction, mutually moving to prescribed positions, in linkage with the magnification changing actions of the photographic shooting optical system 21a.

The inverting optical system, which is a system that is deployed for the purpose of making the viewing image formed by the objective lens group into an erecting normal image, is formed of three prisms, specifically of a first prism 54 and second prism 55 that configure part of the objective optical system, and a third prism 56 that configures part of the eyepiece optical system. Of these, the first prism 54 is formed so as to have a first reflecting surface 54a (first reflecting surface; cf. FIG. 6) formed internally wherein a reflecting surface is formed by aluminum vapor deposition, etc. The second prism 55 is formed so as to have a second reflecting surface 55a (second reflecting surface) and a third reflecting surface 55b (third reflecting surface; cf. FIG. 5 and FIG. 6) formed internally and comprising two fully reflecting surfaces, while the third prism 56 is formed so as to have internally one translucent reflecting surface 56a (fourth reflecting surface comprising a so-called half mirror; cf. FIG. 5 and FIG. 8), respectively. The translucent reflecting surface 56a which is the fourth reflecting surface forms the final reflecting surface in the finder optical system in this finder unit.

The objective optical system is configured by the objective lens group including the first, second, and third lenses 51, 52, and 53 described above, and the first and second prisms 54 and 55 in the inverting optical system.

The eyepiece optical system, on the other hand, which is a system that is deployed for the purpose of forming an enlarged image suitable for viewing the viewing image that is made an erecting normal image by the inverting optical system, is configured by the third prism 56 in the inverting optical system and the eyepiece lens (so-called loupe) 57.

As diagrammed in FIGS. 3A, 3B, and 3C, moreover, the second prism 55 and the third prism 56 are deployed so as to have a prescribed interval between them, that is, the interval indicated by the symbols D1 and D2 in FIGS. 3A, 3B, and 3C. Also, the viewing image formed by the objective optical system is set so that image formation occurs in a focused condition at the position indicated by the symbol A in FIGS. 3A, 3B, and 3C. Accordingly, in the description which follows, the position indicated by the symbol A in FIGS. 3A, 3B, and 3C is taken as the image formation position.

Also, each of the optical elements (lenses and prisms, etc.) configuring the several optical systems is deployed, respectively, as diagrammed in FIGS. 4, 5, and 6.

In this finder unit, meanwhile, besides the optical system for forming the viewing image, a fourth prism 58 is deployed for the purpose of adjusting the direction of light flux advance, as diagrammed in FIGS. 4, 5, and 6. This fourth prism 58 is bonded to the outside of the surface of the third prism 56 described earlier on which the translucent reflecting surface 56a (fourth reflecting surface) is deployed, and thereby the fourth prism 58 is deployed integrally with the third prism 56.

In the vicinity of this fourth prism 58 are deployed the light measuring sensor 15 that configures part of the light measuring means at a prescribed position, and an in-finder display panel 60 constituting display means for displaying, within the range of the finder field of view, prescribed information, that is, finder field of view information, superimposed on the viewing image, so that it can be viewed.

The light measuring sensor 15 is deployed in a prescribed position in the light path of the light flux that passes through the translucent reflecting surface 56a of the third prism 56 and advances straight ahead, that is, on a line that is an extension of the axis of the light incident at that translucent reflecting surface 56a, so that the light receiving surface is in opposition to a condensing lens 58a in the fourth prism 58.

The in-finder display panel 60 is deployed on a line that is an extension of the optical axis (light path) of the light flux that proceeds toward the eyepiece lens 57 after being reflected by the translucent reflecting surface 56a of the third prism 56, that is, on a line that is an extension of the reflected optical axis of the translucent reflecting surface 56a (the fourth reflective surface), at a prescribed position on the opposite side from where the eyepiece lens 57 is deployed astride the third prism 56 and fourth prism 58, that is, at a prescribed position close to the front surface of the camera 1. The position where this in-finder display panel 60 is deployed is also set so that it becomes a position that is substantially optically equivalent to the image formation position for the viewing image formed by the objective optical system.

Figure 9:
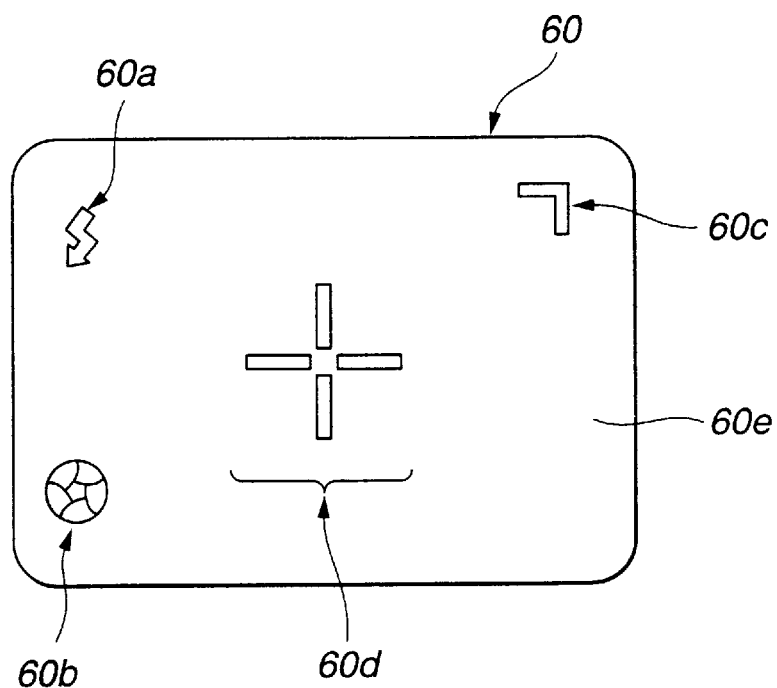
FIG. 9 is an enlarged view showing only the in-finder display panel in the finder unit of this embodiment taken out.

FIG. 9 is an enlarged diagram representing the in-finder display panel in this finder unit taken out. This in-finder display panel 60 is formed by a thin sheet-form member wherein are deployed a plurality of light transmitting sites (60a, 60b, 60c, 60d) of prescribed forms at prescribed positions. These multiple light transmitting sites should be respectively formed by light-diffusing surfaces. By forming these with light-diffusing surfaces, light irradiating the multiple light transmitting sites diffuses, and thereby the display can be more clearly viewed.

These light transmitting sites of prescribed form are formed by punching out part of the sheet-form member in a prescribed form such as a letter, hieroglyph, or symbol, etc., as diagrammed in FIG. 9, for example, in order to display forms that can be visually recognized inside the finder and display the finder field of view information by prescribed means.

In FIG. 9, symbol 60a indicates an example of a display for representing information relating to the strobe unit, symbol 60b an example of a display for representing information relating to photographic shooting operation, and symbol 60c an example of a display for representing a parallax correction index that is information relating to the range of the finder field of view. Symbol 60d is an example of an in-finder display representing a target mark that constitutes an index [used] when performing distance measuring or light measuring operations. Various other forms for these light transmitting sites can of course be conceived of without limitation to these examples.

The portion of the in-finder display panel 60 other than the light transmitting sites (the portion indicated by the symbol 60e in FIG. 9) is formed so that it does not transmit light flux. This portion will be called the non-light-transmitting portion 60e.

As diagrammed in FIG. 5 and FIG. 6, on the front of this in-finder display panel 60, that is, on the front side of the camera 1, is deployed a light-intaking window 42, made of ground glass or the like, constituting natural light illumination means (first illumination means) for illuminating the in-finder display panel 60 by natural light. The inner surface of this light-intaking window 42, that is, the surface facing toward the interior of the camera 1, is subjected to a treatment to make it a diffusing surface.

Meanwhile, a condensing lens 58a is deployed integrally in the light path for the light flux in the output surface 58b of the fourth prism 58 that outputs the light flux that is input from the second prism 55 side to the third prism 56 and is transmitted therethrough, without being reflected by the translucent reflecting surface 56a of that third prism 56, so that it advances straight ahead. This condensing lens 58a is set so that it condenses the input light flux and outputs that light flux in a prescribed direction, that is, toward the light receiving surface of the light measuring sensor 15.

Thus the fourth prism 58, simultaneously with guiding the light flux that is transmitted through the third prism 56 without being reflected by the translucent reflecting surface 56a thereof, also functions to guide the light flux that was input from the light-intaking window 42 and transmitted through the in-finder display panel 60, and which was transmitted through the translucent reflecting surface 56a of the third prism 56, toward the eyepiece lens 57 side. Accordingly, the fourth prism 58, which functions in such manner, does not directly contribute to functions for viewing the viewing image, etc. In view of this fact, this fourth prism 58 is omitted from the expanded views of the finder optical system diagrammed in FIGS. 3A, 3B, and 3C.

Meanwhile, on the front side of the in-finder display panel 60 diagrammed in FIG. 7, that is, on the side where the light-intaking window 42 is deployed, at a position that is in opposition to the in-finder display panel 60, electrical illumination means (second illumination means) for illuminating that in-finder display panel 60 by an electrical light emitting element are provided.

These electrical illumination means are configured by a prescribed flexible printed circuit board 62, and, mounted on that flexible printed circuit board 62, light emitting diodes (hereinafter called LEDs) 62a, 62b, and 62c and an in-finder display circuit 37 (cf. FIG. 2) for controlling those LEDs.

These electrical illumination means, moreover, are supported by the a field of view frame member 61 that is diagrammed in FIG. 8. That field of view frame member 61 is omitted from FIG. 7, however, to avoid cluttering the diagram, in the interest of clearly representing the positional relationship between the flexible printed circuit board 62 and the in-finder display panel 60 (cf. FIG. 8 for the details of the field of view frame member 61).

Accordingly, in this case, in a condition wherein the flexible printed circuit board 62 whereon the LEDs 62a, 62b, and 62c are mounted is situated in a prescribed position by the field of view frame member 61, the LED 62a light emitter is positioned in opposition to the light transmitting site 60a of the in-finder display panel 60, the LED 62b light emitter is positioned in opposition to the light transmitting site 60b of the in-finder display panel 60, and the LED 62c is positioned in opposition to the light transmitting site 60c of the in-finder display panel 60.

The LEDs 62a, 62b, and 62c are controlled by the in-finder display circuit 37, noted earlier, so that they light or flash according to conditions corresponding respectively to the photographic shooting mode or shooting action. Accordingly, the respectively corresponding light transmitting sites 60a, 60b, and 60c (first light transmitting sites; described subsequently) are illuminated according to prescribed conditions by the LEDs 62a, 62b, and 62c (the first electrical illumination means).

In this embodiment aspect, as described in the foregoing, the light transmitting site 60a is made an in-finder display for representing information relating to the strobe unit. Accordingly, the LED 62a corresponding thereto will be controlled to light or to flash at the following times. Control is effected so that, for example, the LED 62a is lit when it is judged that the brightness of the surrounding environment is low according to the results of a light measuring operation by the light measuring means, is made to flash when, at times when a shooting mode involving strobe emissions (mandatory strobe emission mode or the like) has been switched to, the status of the strobe unit (charge status and the like) is verified and the strobe is being charged, and is lit when strobe unit preparations are finished. Thus visual verification can be made as to whether or not a strobe emission operation is necessary.

The light transmitting site 60b is an in-filter display for representing information relating to photographic shooting operations. The LED 62b corresponding thereto, therefore, is controlled so that, for example, it lights for a prescribed time period when it is judged that a shutter release action has been normally concluded, and so that it flashes when some kind of abnormality has been detected during a shutter release action, etc. Thus visual verification can be made as to whether or not a release action has been effected.

The light transmitting site 60c is an in-filter display for representing a parallax correction index constituting information relating to the range of the finder field of view. The LED 62c corresponding thereto is controlled so that, for example, it lights when it is judged that the distance to a desired photographic subject is shorter than a prescribed distance, as a result of a distance measuring action by the distance measuring means, and displays a finder field of view frame corrected for parallax when making close-up shots. Thus visual verification can be made of a parallax-corrected finder field of view index generated during close-up shooting.

The flexible printed circuit board 62 is deployed on the front side of the in-finder display panel 60, that is, on the side where the light-intaking window 42 is deployed. The shape thereof is such that some of the area of the in-finder display panel 60, specifically an area corresponding to a prescribed light transmitting site (the light transmitting site 60d in the first embodiment) is exposed, and such that the other light transmitting sites (the light transmitting sites 60a, 60b, and 60c in the first embodiment) are covered by the flexible printed circuit board 62. Tn other words, this functions to block light and prevent the light transmitting sites other than the light transmitting site 60d, namely the light transmitting sites 60a, 60b, and 60c, from being illuminated by the natural light flux input from the light-intaking window 42. Accordingly, the light flux input from the light-intaking window 42 (the first illumination means) illuminates only a specific light transmitting site (60d) in the in-finder display panel 60, and the flexible printed circuit board 62 is formed in such shape as to block light to the other light transmitting sites (60a, 60b, 60c). Thereupon, in the description that follows, the light transmitting sites 60a, 60b, and 60c will be called the first light transmitting sites, and the light transmitting site 60d will be called the second light transmitting site.

In this embodiment, moreover, a flexible printed circuit board is used, but of course an ordinary hard board may also be used. If in addition the flexible printed circuit board or hard board has a black coating applied to its surface, or black materials are used therefor, the light blocking qualities thereof can be enhanced.

Furthermore, an LED 62d constituting second electrical illumination means that is an electrical light emitting element like the LEDs 62a, 62b, and 62c described earlier is deployed at a position where it can illuminate the second light transmitting site 60d of the in-finder display panel 60, that position being a prescribed position on the front (light-intaking window 42 side) of the in-finder display panel 60. This LED 62d is mounted on the flexible printed circuit board 62 described earlier or the like, and this LED 62d is electrically connected to the in-finder display circuit 37. In FIG. 7, however, the wiring and so forth are not shown in order to avoid cluttering the diagram. In the description that follows, whereas the LED 62d is called the second electrical illumination means, the LEDs 62a, 62b, and 62c are called the first electrical illumination means.

Thus the second light transmitting site 60d in the in-finder display panel 60 in this finder unit, in addition to being in a condition wherein it is always illuminated by natural light input from the light-intaking window 42, will also be illuminated by the LED 62d that lights or flashes under prescribed conditions.

In this embodiment aspect, the second light transmitting site 60d is an in-finder display that represents a target mark that becomes an index when performing distance measuring or light measuring operations. Accordingly, the LED 62d corresponding thereto is controlled so that it lights or flashes at the following times. For example, as described above, even when the LED 62d is extinguished, [the light transmitting site 60d ] is always displayed by the illumination from natural light. In this condition, the display resulting from the second light transmitting site 60d will be the index (target mark) when effecting distance measuring or light measuring operations. Then, an instruction signal is issued from the 1st release detection switch 33, a distance measuring action is performed by the distance measuring means, and, when this ends normally, when a prescribed focus adjustment action based on those distance measuring results has been completed by the lens drive mechanism or the like, the in-finder display circuit 37 effects control to light the LED 62d. Thus it becomes possible to visually verify that a focus adjustment action has been concluded for the desired photographic subject.

Figure 10:
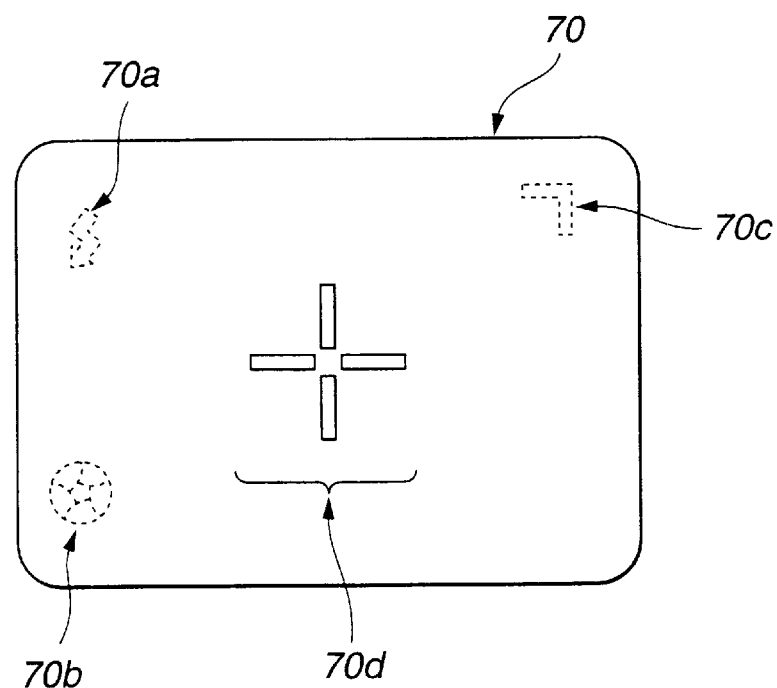
FIG. 10 is a diagram representing an example of the condition in which the in-finder display panel is illuminated only by natural light, in a normal condition in the finder unit of this embodiment, with all of the light emitting elements turned off.

FIG. 10 represents a display in the finder field of view 70 in a normal condition in this finder unit, that is, in a condition wherein all of the LEDs 62a, 62b, 62c, and 62d are extinguished and the in-finder display panel 60 is illuminated only by natural light.

In this condition, the displays 70a, 70b, and 70c (which are normally not seen) corresponding to the first light transmitting sites 60a, 60b, and 60c will all be in a non-displaying condition wherein they are not displayed, and the second light transmitting site 60d will be such that only the display 70d corresponding thereto is displayed by the illumination from natural light flux.

Now, the in-finder display panel 60 and flexible printed circuit board 62 described earlier are held by the field of view frame member 61 provided for forming the finder field of view frame in the vicinity of the image formation position for the viewing image [produced] by the objective optical system. This field of view frame member 61, as diagrammed in FIG. 8, is formed of a member having a substantially L-shaped cross-section, with an arm 61e that is one arm thereof deployed in the vicinity of the image formation position in a space provided between the second prism 55 and the third prism 56.

The one arm 61e of the field of view frame member 61 has a substantially rectangular opening, namely a field of view frame opening 61k, punched out substantially in the vicinity of the center of the surface facing the output surface 55k of the second prism 55, made so that it does not interfere with the light path of the light flux directed from the second prism 55 toward the third prism 56. In addition, the range of the field of view frame in this finder unit is defined so as to restrict the range wherein that light flux is input to the third prism 56.

Also, in the vicinity of the tip end of the one arm 61e, on the surface on the side facing the output surface 55k of the second prism 55, are formed a hole 61g and an oblong hole 61h into which engage two support pins 55g and 55h implanted at prescribed positions at the outer edge on the back side of that output surface 55k. Accordingly, by engaging the two support pins 55g and 55h of the second prism 55 into the hole 61g and the oblong hole 61h of the field of view frame member 61, provision is made so that the second prism 55 supports the field of view frame member 61 and holds it in the prescribed position.

Meanwhile, the other arm 61f that is the arm on the other side of the field of view frame member 61 is positioned at a prescribed position facing the input surface 58c of the fourth prism 58, sandwiching the in-finder display panel 60. This arm 61f also constitutes a holding unit that positions and holds the in-finder display panel 60 (constituting display means and in-finder display means) and the LEDs 62a, 62b, and 62c (the first electrical illumination means and the second illumination means) mounted on the flexible printed circuit board 62 so that they assume prescribed positions in the interior of this finder unit.

In this case, mutually opposed grooves 61m (the lower whereof is not diagrammed in FIG. 8) are provided on the insides of the upper edge and lower edge of the other arm 61f of the field of view frame member 61, at prescribed positions on the side facing the fourth prism 58, in such manner that the in-finder display panel 60 can be placed therein.

FIG. 8, it should be noted, represents a condition wherein the in-finder display panel 60 has been removed from the field of view frame member 61. By engaging the in-finder display panel 60 in the grooves 61m of the field of view frame member 61, from this condition, and then sliding the in-finder display panel 60 in the direction indicated by the arrow X in FIG. 8, the in-finder display panel 60 is deployed in a prescribed position in the field of view frame member 61.

Meanwhile, in the other arm 61f of the field of view frame member 61 in the condition wherein the in-finder display panel 60 is deployed integrally therewith, as described above, cutout openings 61aa, 61bb, 61cc, and 61dd are provided, at positions respectively opposed to the first and second light transmitting sites 60a, 60b, 60c, and 60d in the in-finder display panel 60. Also provided are recesses 61a, 61b, and 61c in the vicinities of the cutout openings 61aa, 61bb, and 61cc, respectively, in the surface on the side facing the light-intaking window 42.

The flexible printed circuit board 62 is deployed on the surface on the side of the other arm 61f of the field of view 61 facing the light-intaking window 42, but, in this case, the LEDs 62a, 62b, and 62c mounted on that flexible printed circuit board 62 are deployed in the recesses 61a, 61b, and 61c, respectively. Thereupon, moreover, the emitters of the LEDs 62a, 62b, and 62c are deployed at positions corresponding to the cutout openings 61aa, 61bb, and 61cc, respectively. Thus, by the LEDs 62a, 62b, and 62c being held by the recesses 61a, 62b, and 62c, the flexible printed circuit board 62 will be held definitely in the field of view frame member 61. At the same time, the emitters of the LEDs 62a, 62b, and 62c will be deployed so that they are exposed from the respectively corresponding cutout openings 61aa, 61bb, and 61cc on the side of the in-finder display panel 60. However, the emitters of the LEDs 62a, 62b, and 62c are deployed so that they are accommodated within the range of the thickness direction of the field of view frame member 61.

That being so, the configuration is such that the first light transmitting sites 60a, 60b, and 60c of the in-finder display panel 60 are illuminated only by the emitters of the LEDs 62a, 62b, and 62c corresponding thereto, respectively. Because the emitters of the LEDs 62a, 62b, and 62c are deployed so as to be accommodated within the range in the thickness dimension of the field of view frame member 61, as noted earlier, the illumination light from each emitter illuminates only the first light transmitting site to which it should correspond, namely 60a, 60b, or 60c, respectively, and does not affect the other light transmitting site (i.e. the second light transmitting site 60d). In other words, the configuration is such that the illuminating light from each emitter illuminates only [a light transmitting site] in a prescribed direction, and such that illumination light advancing in other directions is blocked by the wall surface of the field of view frame member 61.

Furthermore, in the space between the light-intaking window 42 and the field of view frame member 61, the LED 62d is deployed, as noted earlier, but the deployment position for this LED 62d is a position that faces the cutout opening 61dd in the other arm 61f of the field of view frame member 61, and provision is made so that the second light transmitting site 60d of the in-finder display panel 60 is deployed behind that cutout opening 61dd. Accordingly, the configuration is such that the illumination light from the emitter of the LED 62d can pass through the cutout opening 61dd and illuminate the second light transmitting site 60d.

Also, the flexible printed circuit board 62 is deployed on the surface of the field of view frame member 61 on the side where the light-intaking window 42 is situated, but, when this is done, the cutout openings 61aa, 61bb, and 61cc will be covered by the flexible printed circuit board 62 and the LEDs 62a, 62b, and 62c. At the same time, the printed circuit board 62 is provided with the cutout opening 62dd in a prescribed range so that the cutout opening 61dd is exposed.

Thus the configuration is such that the natural light input into the camera main body from the light-intaking window 42 is blocked so that it does not illuminate the first light transmitting sites 60a, 60b, and 60c of the in-finder display panel 60, but so that it always provides illumination for the second light transmitting site 60d.

Also, the image formation position for the viewing image formed by the objective optical system (i.e. the position indicated by the symbol A in FIGS. 3A, 3B, and 3C) is set as described below.

In the finder unit in this embodiment aspect, as described earlier, the second prism 55 (first optical element; first optical component) is positioned closer to the objective optical system than the viewing image formation position A, and the third prism 56 (second optical element; second optical component) is deployed closer to the eyepiece optical system than the viewing image formation position A.

In this case, if, for example, we represent the focal length of the eyepiece optical system as f (mm), the distance between the output surface (55k; cf. FIG. 8) of the second prism 55 and the viewing image formation position A as D1 (mm), and the distance between the input surface of the third prism 56 and the viewing image formation position A as D2 (mm)(cf. FIGS. 3A, 3B, and 3C), then the image formation position A is set so that the formulas (1) and (2) below are satisfied.

$$4 < 1000 \times D1/f^2 \ (1/m) \quad (1)$$

$$4 < 1000 \times D2/f^2 \ (1/m) \quad (2)$$

This represents the position of the output surface of the second prism 55 or of the input surface of the third prism 56 relative to the image formation position for the viewing image viewed by the eyepiece lens 57. According to the conditional expressions noted above, the surfaces are set at a distance so that, relative to the viewing diopter at the image formation position, the viewing diopters at the positions of the output surface of the second prism 55 and the input surface of the third prism 56 become greater than 4 diopters (1/m). That is, conditions are set in order that, relative to the viewing image formation position, the surfaces of the second prism 55 and the third prism 56 on the image formation position side are separated by a sufficient distance so that the dust and grime, etc., adhering to the surfaces, etc., of the second prism 55 and the third prism 56 are not viewed.

In other words, although the human eye is capable of observing an object within some degree of a range of visibility, even when the visibility is somewhat displaced, when the visibility is displaced more than a prescribed amount, the dust and grime, etc., adhering to the surface of the second prism 55 and the third prism 56 are made so that they are not observed.

Also, the second prism 55 and the third prism 56 are deployed so that they are separated, relative to the image formation position of the viewing image formed by the objective optical system, on the objective optical system side and on the eyepiece optical system side, wherefore the dust and grim or scratches adhering to the surfaces of both prisms 55 and 56 and the dust and the like present inside the prisms are not observed.

The amount of the visibility displacement noted above, in actual use, will be sufficient if separated by 3 to 4 diopters (1/m) or so, and will be even more effective if separated by 5 to 6 diopters (1/m).

In view of that, in this embodiment, the setting is made so that the displacement is at least 4 diopters (1/m), as represented in the formulas (1) and (2) given earlier. This can be simply expressed as in formula (3) below.

$$8<1000\times(D1+D2)/f^2 \text{ (1/m)} \tag{3}$$

Furthermore, setting is made so that the relationship between the distance D1 (mm) between the output surface 55k of the second prism 55 (cf. FIG. 8) and the viewing image formation position A, on the one hand, and the distance D2 (mm) between the input surface of the third prism 56 and the viewing image formation position A, on the other, becomes as expressed in (4) below.

$$D1 \leq D2 \tag{4}$$

The reason therefor is as follows.

That is, it is usual that, with respect to the visibility of humans in general, the visibility values will be slightly on the minus side. It is possible here, with a finder unit wherein the viewing image formation position is set so that D1>D2, under conditions adjusted so as to be ideal for a person with normal vision, that a near-sighted person, when viewing, will be able to see the dust and grim and the like adhering to the input surface of the third prism 56. That being so, it is preferable that the relationship be set as represented in formula (4) above.

The focal length f of the eyepiece optical system, on the other hand, is made approximately 20 to 30 mm in ordinary cases. However, if this is made approximately 10 to 20 mm, making the focal length f shorter than in ordinary cases (so that 10 s f s 20 (mm)), the distances D1 and D2 noted earlier can be set smaller. Accordingly, as a consequence, in addition to making the finder unit smaller, if the magnification power of the eyepiece optical system is made larger, it will become possible to set the finder magnification larger without making the objective optical system larger. In view of the points noted in the foregoing, the focal length in the eyepiece optical system in this embodiment is made approximately 15 mm.

When the focal length f in the eyepiece optical system becomes shorter than 10 mm or so, it becomes very difficult to deploy a reflecting surface between the image formation position and the eyepiece lens, so such a short focal length f is undesirable.

In this case, moreover, the formula (3) given earlier can be expressed as in (5) below.

$$0.8<D1+D2<3.2 \text{ (mm)} \tag{5}$$

Also, settings are desirable such that, in formula (4) given above, the following condition holds.

$$D1=D2 \tag{6}$$

In this embodiment, moreover, in order to make it possible to shorten the focal length in the eyepiece optical system, in terms of the reflecting surfaces in the inverting optical system, three surfaces (first reflecting surface 54a, second reflecting surface 55a, and third reflecting surface 55b) are deployed on the objective optical system side relative to the viewing image formation position, and one surface (translucent reflecting surface 56a) is deployed on the eyepiece optical system side.

Furthermore, as described earlier, the in-finder display panel 60 must be deployed in a position that is optically equivalent to the viewing image formation position, but, by implementing innovative measures relating to the configuration of such an inverting optical system and to the focal length in the eyepiece optical system, it is possible to deploy the eyepiece optical system and the in-finder display panel 60 in closer proximity, and thereby to make the unit itself smaller.

The operation of the finder unit in the first embodiment of the present invention, configured in this manner, is now described.

First, light flux from the photographic subject input from the first lens 51 passes through the second lens 52 and the third lens 53 and is input to the first prism 54, whereupon it is reflected by the first reflecting surface 54a of that first prism 54. Thereby, the light path of this light flux is bent by an angle of approximately 90 degrees to orient it upward (in FIG. 4) and the light flux is input to the second prism 55.

The light flux input to the second prism 55 is reflected by the second reflecting surface 55a and the third reflecting surface 55b, respectively, of that second prism 55, so that the light paths thereof are respectively altered so that light flux is output from the output surface 55k (cf. FIG. 8) of the second prism 55, is limited to a prescribed range by passing through the field of view frame opening 61k in the field of view frame member 61, and is then input to the third prism 56.

Some of the light flux input to the third prism 56 is reflected by the translucent reflecting surface 56a of the third prism 56, so that the light path thereof is bent by an angle of approximately 90 degrees, and so that it is guided to the eyepiece lens 57 side. Accordingly, a condition is realized wherewith the viewing image can be viewed by the eyepiece lens 57.

The other portion of the light flux input to the third prism 56, after being transmitted through the translucent reflecting surface 56a of the third prism 56, is guided via the condensing lens 58a to the light measuring sensor 15. Thus a condition is realized wherein the prescribed light measuring operation can be effected.

Furthermore, natural light flux from the light-intaking window 42 is also input to the interior of this finder unit, separately from the light flux input from the first lens 51 as described in the foregoing. This light flux from the light-intaking window 42, as diagrammed in FIG. 5 and FIG. 6, after being transmitted through the in-finder display panel 60, is input to the fourth prism 58, and, after being transmitted through the translucent reflecting surface 56a of the third prism 56, advances further and is guided to the eyepiece lens 57. Accordingly, at the eyepiece lens 57, a finder image will be viewed wherein the display of the in-finder display panel 60 formed by the light flux input from the light-intaking window 42, that is, a display (target mark, etc.) of the form expressed by the second light transmitting site 60d, is superimposed on the viewing image formed by the light flux input from the first prism 54 as described above.

Also, when the lighting or flashing of the plurality of LEDs 62a, 62b, 62c, and 62d is controlled according to the operational condition of the camera 1, displays that correspond respectively to those LEDs 62a, 62b, 62c, and 62d, that is, displays of the forms expressed by the first and second light transmitting sites 60a, 60b, 60c, and 60d, will be effected.

Based on this first embodiment, as described in the foregoing, the field of view frame member 61 that is a member which defines the field of view frame is formed with a substantially L-shaped cross-section, in one arm 61e thereof is provided a field of view frame opening, and in the other arm 61f thereof is formed integrally a holding unit for holding the in-finder display panel 60 that constitutes means for displaying field of view information. Therefore, in addition to being able easily to correctly set the positional relationship between the field of view frame member 61 and the in-finder display panel 60, without increasing the number of components, the unit can be prevented from becoming large and it is easy to contribute to reducing manufacturing costs.

Further, by setting the interval between the second prism 55 and the third prism 56 so that the conditional expressions represented in formulas (3) and (4) given earlier are satisfied, it is possible to always obtain a good viewing image such that the dust and grime, etc., adhering to the surfaces of the two prisms 55 and 56 are not seen.

Also, simultaneously therewith, as illumination means for illuminating the in-finder display panel 60, besides the light-intaking window 42 constituting natural light illumination means, the LEDs 62a, 62b, 62c, and 62d, which are electrical illumination means, are deployed at respectively prescribed positions, so that, even when the brightness of the surrounding environment wherein the camera 1 equipped with this finder unit is used is low, prescribed in-finder displays can easily be viewed with clarity.

Furthermore, in addition to implementing innovations in the configuration of the inverting optical system, as in this embodiment, provision is made for setting the focal length of the eyepiece optical system shorter, wherefore the in-finder display panel 60 can be deployed in close proximity to the eyepiece optical system, so that the unit itself can be made smaller.

Also, because the distances D1 and D2 between the viewing image formation position, on the one hand, and the second prism 55 and third prism 56, on the other, are set so as to satisfy a prescribed relationship as expressed by formula (3) and the conditional expressions (4) and (5), good viewing images can always be viewed.

Figure 11:
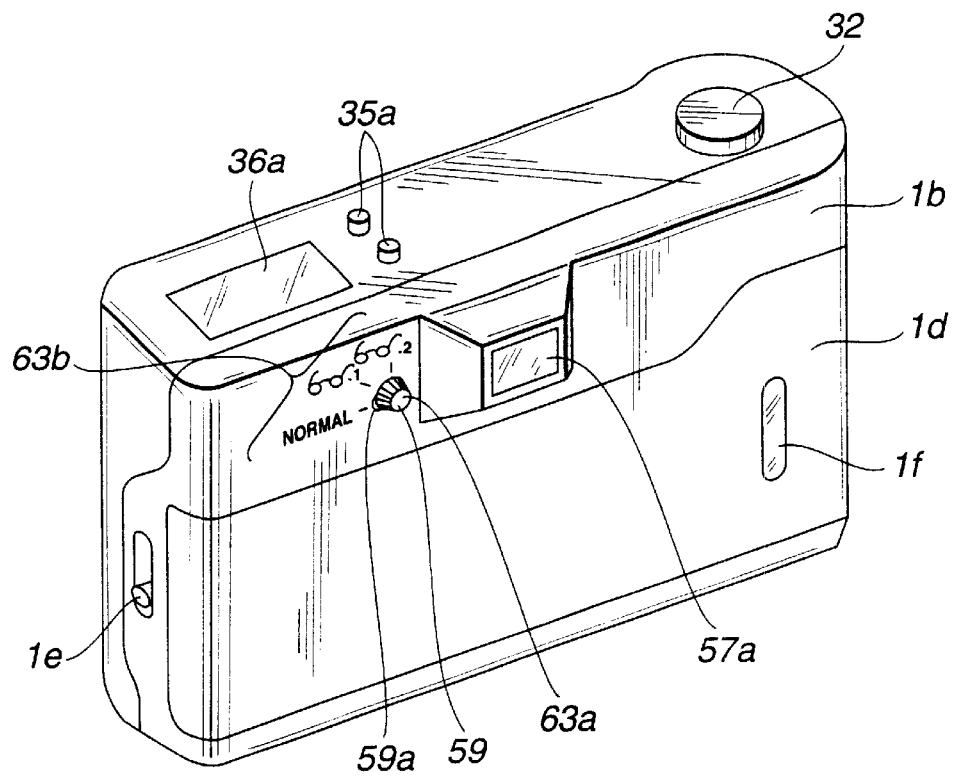
FIG. 11 is a diagonal view representing the exterior appearance of the back side of a camera in which a finder unit in a second embodiment of the present invention is employed.

FIG. 11 is a diagonal view representing the exterior appearance of the back side of a camera wherein the finder unit of a second embodiment of the present invention is employed. This second embodiment is basically similar to the first embodiment described in the foregoing. Accordingly, configurations that are the same as in that first embodiment are indicated by the same symbols and no further description thereof is given here. Only drawings necessary to the description are presented, and FIG. 1 to 10 used in describing the first embodiment earlier will be referenced as necessary.

First, the points of difference in the configuration of the camera in this second embodiment of the present invention from the camera in the first embodiment described earlier are described.

On the back side of the camera in this second embodiment is deployed an opening for loading film into the camera, and a rear door panel 1d is deployed so as to cover that opening, as diagrammed in FIG. 11. This rear door panel 1d is made so that it can be opened and closed by one end thereof being supported at the end of a rear cover 1b so that it can turn freely. When the rear door panel 1d is in the closed condition (condition indicated in FIG. 1 and FIG. 11), provision is made to hold it in that condition by a prescribed locking mechanism (not shown). An unlocking member 1e is deployed on one side surface of the camera in order to disengage the locking mechanism and put the rear door panel 1d in an open condition.

In the vicinity of the upper edge of the back side of the camera, substantially in the center thereof, is deployed a finder eyepiece window 57a, on the eyepiece optical system side of the finder optical system. At a prescribed position on the inside of this finder eyepiece window 57a is deployed the eyepiece lens 57 of the eyepiece optical system, described subsequently (cf. FIGS. 3A, 3B, and 3C).

At a prescribed position near the finder eyepiece window 57a is deployed a visibility adjustment operating dial 59 that is a control member configuring part of visibility adjustment means for adjusting the viewing visibility in the finder unit within a prescribed range, so that it can be freely turned within a prescribed range. A protrusion 59a is formed integrally in the visibility adjustment operating dial 59, on the outer circumference thereof. At a prescribed position on the end surface of the visibility adjustment operating dial 59, that is, at a position corresponding to the protrusion 59a, is provided an index mark 63a, by prescribed means such as printing, painting, or affixing a sticker, etc.

Also, at prescribed positions on the rear cover 1b corresponding to the protrusion 59a and index mark 63a of the visibility adjustment operating dial 59 are provided multiple index marks 63b, according to the viewing visibilities that can be set in this finder unit by the visibility adjustment mechanism (cf. FIG. 13, 14, and 15; details described subsequently), by prescribed means such as printing, painting, or affixing a sticker, etc. These index marks 63b are represented by such means as written characters, pictures, or symbols, etc. Provision is made so that, merely by looking at these index marks 63b, one can easily determine what the viewing visibilities are that can be set in this finder unit. In this embodiment, specifically, the index marks 63b described next are indicated as examples.

That is, as diagrammed in FIG. 11, a first position for a person with normal vision is indicated by a form indicated with an English word like "Normal," etc. (that display form being hereinafter called "Normal"), a second position corresponding to a far-sighted person is indicated by a form indicated wherein the numeral "1" is added to a picture representing "eye glasses" (that display form being hereinafter called "eye glasses 1"), and a third position corresponding to a near-sighted person is indicated by a form indicated wherein the numeral "2" is added to a picture representing "eye glasses" (that display form being hereinafter called "eye glasses 2").

At a prescribed position toward the other end of the rear door panel 1d is provided a film verification window if so that the film (cartridge) loaded inside can be verified.

The various kinds of configuring members and the various kinds of electric circuits and the like deployed inside the main body of this camera are configured exactly as in the first embodiment described earlier (cf. FIG. 2).

FIGS. 12A, 12B, and 12C are expanded optical system diagrams representing the finder optical system in this finder unit expanded, and conceptually representing the path of light flux input to the finder optical system. In these diagrams, FIG. 12A represents a condition wherein the eyepiece optical system in the finder optical system is set in a standard position (first position) corresponding to a person with normal vision, FIG. 12B represents a condition wherein that eyepiece optical system is set in a far-sighted position (second position) corresponding to a far-sighted person, and FIG. 12C represents a condition wherein that eyepiece optical system is set in a near-sighted position (third position) corresponding to a near-sighted person. In FIGS. 12A, 12B, and 12C, the symbol A, as in FIGS. 3A, 3B, 3C, and 5, indicates the viewing image formation position in the objective optical system.

The finder optical system in the finder unit in this embodiment is configured, as indicated in FIG. 3A, 3B, 3C, 12A, 12B, and 12C, by an objective optical system formed by a multiple lens group and part of an inverting optical system, and by an eyepiece optical system formed by the other part of the inverting optical system and an eyepiece lens 57.

The configuration of the finder optical system in this embodiment is the same as in the first embodiment described earlier, so no detailed description thereof is given here.

The eyepiece lens 57 is deployed so that it can move in stages in a direction extending along the optical axis of the finder optical system, as diagrammed in FIGS. 12A, 12B, and 12C. That is, this eyepiece lens 57 is configured so that, by prescribed means, specifically by a visibility correction mechanism described subsequently, it moves in stages to several positions, namely the first position corresponding to a person with normal vision as diagrammed in FIG. 12A, the second position corresponding to a far-sighted person as diagrammed in FIG. 12B, and the third position corresponding to a near-sighted person as diagrammed in FIG. 12C (cf. FIGS. 13, 14, and 15).

Further, as diagrammed in FIGS. 3A, 3B, and 3C, and in FIGS. 12A, 12B, and 12C, the second prism 55 (first optical component) and third prism 56 (second optical component) are deployed so as to have therebetween a prescribed interval, specifically the interval indicated by the symbols D1 and D2 in the figure(s).

The viewing image formed by the objective optical system, moreover, is set so that image formation is effected in a condition wherein focus is effected at the position indicated by the symbol A in FIGS. 3A, 3B, and 3C, and in FIGS. 12A, 12B, and 12C. Accordingly, in the description that follows, the position indicated by the symbol A in FIGS. 3A, 3B, 3C, 12A, 12B, and 12C will be called the image formation position.

Next, details of the visibility adjustment mechanism in the finder unit in the second embodiment of the present invention are described.

Figure 13:
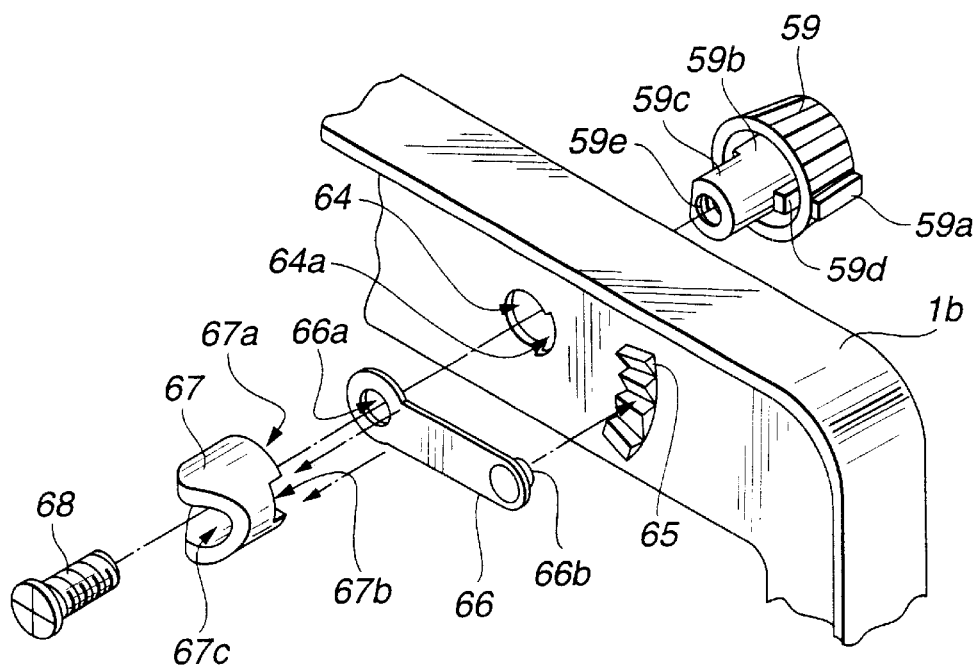
FIG. 13 is an exploded diagonal view of essential parts in a camera wherein the finder unit in the second embodiment of the present invention is employed, showing the configuration of the visibility adjustment mechanism.
Figure 14:
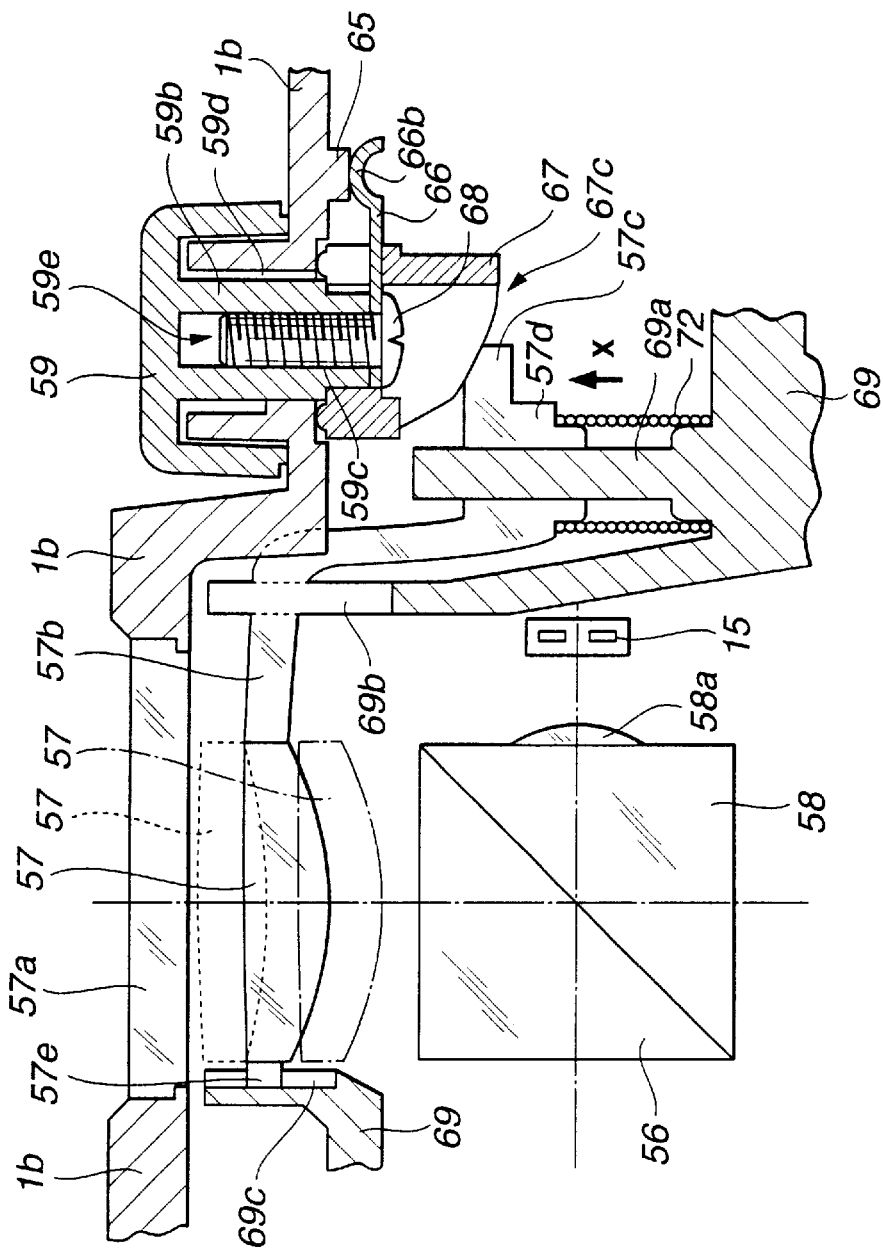
FIG. 14 is a cross-sectional view of essential parts, in a camera wherein the finder unit in the second embodiment of the present invention is employed, showing a cross-section in the vicinity of where the visibility adjustment mechanism is deployed.

FIG. 13 and 14 are diagrams that represent part of a camera wherein the finder unit of this embodiment is employed, wherein is diagrammed the configuration of the visibility adjustment mechanism in this finder unit. Specifically, FIG. 13 is an exploded diagonal view of the essential parts of the visibility adjustment mechanism in this finder unit, while FIG. 14 is a cross-sectional view showing a lateral section in the vicinity where the visibility adjustment mechanism is deployed in the camera wherein this finder unit is employed.

The visibility adjustment mechanism in the finder unit in this embodiment is configured so that it performs viewing visibility adjustments in stages, by moving the eyepiece lens 57 that configures part of the eyepiece optical system that comprises a prescribed optical component of the plurality of optical components that configure the finder optical system, in a prescribed direction, by prescribed movement means, that is, by moving the eyepiece lens 57 in stages within a prescribed range in the direction of the optical axis of the finder optical system.

Specifically, the visibility adjustment mechanism in this finder unit is configured, as diagrammed in FIG. 13, by a cam member 67 having a cam surface 67c that contacts the eyepiece lens 57 at a prescribed position, the visibility adjustment operating dial 59 that is a operate member capable of moving the eyepiece lens 57 in a prescribed direction by turning the cam member 67, and a click mechanism that is a latching member that, when the visibility adjustment operating dial 59 is manipulated to turn, so that the eyepiece lens 57 is moved in stages to each of several positions, namely the first position corresponding to a person with normal vision (cf. FIG. 12A), the second position corresponding to a far-sighted person (cf. FIG. 12B), and the third position corresponding to a near-sighted person (cf. FIG. 12C), latches the visibility adjustment operating dial 59 in those respective positions that correspond to the several positions, namely the first position, the second position, and the third position, and positions and holds the eyepiece lens 57 in a prescribed position.

This click mechanism is composed of a click spring 66 and click cam piece 65. The click spring 66 is made of a spring member having a thin sheet form and an elastic force, and is deployed so as to follow the turning of the visibility adjustment operating dial 59 and the cam member 67. The click cam piece 65 is deployed in a prescribed position on the inner wall surface of the rear cover 1b, and a projection 66b provided in the click spring 66 abuts against the click cam piece 65.

These configuring members are assembled as follows. That is, the visibility adjustment operating dial 59, as diagrammed in FIG. 13, is linked with the cam member 67 through a through hole 64 punched at a prescribed position in the rear cover 1b, a portion whereof is made as a fan-shaped part 64a.

The visibility adjustment operating dial 59 is provided integrally with a stem 59b. This stem 59b is such that the tip end 59c thereof is formed with a substantially D-shaped cross-section, and such that, at a prescribed position on the outer circumferential surface near the root thereof is formed, integrally therewith, a projection 59d that restricts the range of turning of the visibility adjustment operating dial 59. In the tip end of the stem 59b is provided a screw hole 59e.

Accordingly, the stem 59b of the visibility adjustment operating dial 59 is attached by being inserted into the through hole 64 in the rear cover 1b, which insertion is done so that the projection 59d in the stem 59b is mated in the fan-shaped part 64a of the through hole 64. Thus the visibility adjustment operating dial 59 can only turn within a prescribed range, specifically within the range of the fan-shaped part 64a. In other words, the fan-shaped part 64a, by having the projection 59a of the stem 59b of the visibility adjustment operating dial 59 come up against the circumferential extremities thereof, functions as a restricting member to restrict the turning of the visibility adjustment operating dial 59.

The visibility adjustment operating dial 59, when mounted to the back side of the rear cover 1b, is in a condition such that the stem 59b thereof passes through the rear cover 1b and protrudes into the interior. Over a through hole 66a formed in the root part of the click spring 66, and to that is then attached the cam member 67 so as to clamp it.

In the end surface 67a of the cam member 67 is provided a substantially D-shaped through hole (not shown). This through hole, which is in a shape that is like the shape of the tip end 59c of the stem 59b of the visibility adjustment operating dial 59, is made so as to be engaged by the tip end 59c of the stem 59b. In that condition, a screw 68 is screwed into the screw hole 59e in the tip end 59c so that screw fastening is effected. Thus the visibility adjustment operating dial 59 and the cam member 67 are formed integrally, and the cam member 67 will turn along with manipulations to turn the visibility adjustment operating dial 59, in the same direction.

At this time, furthermore, the click spring 66 that is clamped between the visibility adjustment operating dial 59 and the cam member 67 will be such that the root part thereof engages an indentation 67b provided in the cam member 67. Thus the click spring 66 is also formed integrally with the visibility adjustment operating dial 59 and the cam member 67, so that it turns along with manipulations turning the visibility adjustment operating dial 59, in the same direction.

At this time, moreover, the projection 66b in the tip end of the click spring 66 will be deployed so that it makes contact with the click cam piece 65.

Figure 15:
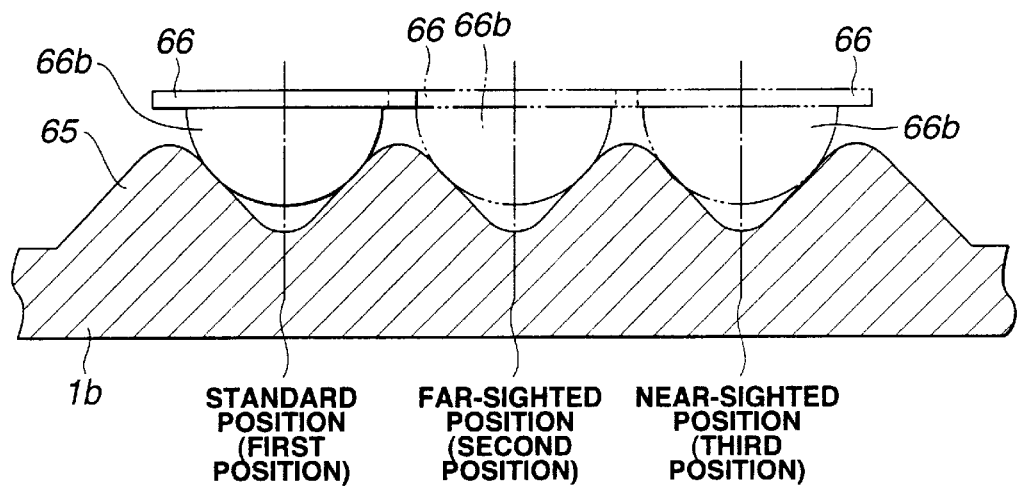
FIG. 15 is an expanded cross-sectional view of essential parts, representing the condition wherein a click cam and a click spring make contact in the visibility adjustment mechanism diagrammed in FIG. 13.

FIG. 15 is an enlarged cross-sectional view of main parts showing how contact is made between the click cam piece 65 and the projection 66b in the click spring 66.

In this case, when the click spring 66 turns along with the turning manipulations of the visibility adjustment operating dial 59, in the same direction, the projection 66b in the click spring 66 moves in conjunction therewith while contacting the click cam piece 65. The projection 66b in the click spring 66 is such that it contacts the valleys in the click cam piece 65, due to the action of the elastic force which the click spring 66 exhibits, and, in such position, latches the turning of the visibility adjustment operating dial 59 and holds the position thereof.

Meanwhile, the eyepiece lens 57, as diagrammed in FIG. 14, has a support arm 57b formed integrally in one side surface thereof. This support arm 57b extends outward from a hole 69b formed at a prescribed position in the finder unit case 69, and is formed in a shape such that the tip end thereof is deployed near the visibility adjustment mechanism.

That is, a sleeve 57d is integrally formed near the tip end of the support arm 57b, and at one of that sleeve 57d, on the outside thereof, a cam follower 57c is formed that makes contact with a cam surface 67c of the cam member 67 that configures part of the visibility adjustment mechanism.

The sleeve 57d mates, so that it can freely slide, with a shaft 69a implanted so that it protrudes toward the back surface side of the camera 1 from a prescribed position on the outer wall surface of the finder unit case 69. At this time, a spring 72 that is an elastic member exhibiting extendability is deployed between the sleeve 57d and the finder unit case 69. This spring 72 continually exerts a force against the sleeve 57d in the direction indicated by the arrow X in FIG. 14. Thus the cam follower 57c formed integrally in the sleeve 57d is made to always be in contact with the cam surface 67c of the cam member 67.

The sleeve 57d, mates with the shaft 69a so that it slides freely, as described above. As a consequence, the eyepiece lens 57 is supported relative to the finder unit case 69, and the movement thereof is guided in a direction extending along the optical axis of the eyepiece lens 57.

Also, on the other side surface of the eyepiece lens 57, a projection 57e is formed. This projection 57e mates with a groove 69c which is formed at a prescribed position on the finder unit case 69 so as to extend in a direction along the optical axis of the eyepiece lens 57. The groove 69c is formed in a position that is in opposition to the hole 69b described earlier, and the eyepiece lens 57 is deployed in the space between that groove 69c and the hole 69b.

Accordingly, the edges on both sides of the eyepiece lens 57 are supported by the groove 59c that mates with the projection 57e and by the shaft 69a that mates with the sleeve 57d of the support arm 57b, and the eyepiece lens 57 is capable of moving in a direction extending along the optical axis.

Since the cam follower 57c is continually in contact with the cam surface 67c, the eyepiece lens 57 will follow the cam member 67 and move in a direction extending along the optical axis.

The visibility adjustment operating dial 59 and the cam member 67, as described in the foregoing, are configured so that they can be turned integrally by manipulations turning the visibility adjustment operating dial 59. Also, the configuration is such that the cam member 67, etc., turns along with the turning manipulations of the visibility adjustment operating dial 59. Thus the configuration is such that the eyepiece lens 57 moves in a prescribed direction, that is, in the direction of the optical axis, via the cam follower 57c that contacts the cam surface 67c of the cam member 67. In this way, movement means for the eyepiece lens 57 are configured by the visibility adjustment operating dial 59 and the cam member 67, and the visibility adjustment mechanism of this finder unit is configured.

The visibility adjustment operating dial 59 is made so that, by turning it within a prescribed range, the eyepiece lens 57 can be made to move in a direction extending along the optical axis of the finder optical system. At such time, the eyepiece lens 57, due to the action of the click mechanism, will be set in stages in several positions, namely the first position, second position, and third position described earlier. Also, the position of the eyepiece lens 57 indicated by the solid lines in FIG. 14 represents the first position that is a standard position corresponding to a person with normal vision, while the position of the eyepiece lens 57 indicated by the broken lines represents the second position that is a position corresponding to a far-sighted person and the position of the eyepiece lens 57 indicated by the dotted broken lines represents the third position that is a position corresponding to a near-sighted person.

Also, the shape of the cam surface 67c of the cam member 67 is formed such that the eyepiece lens 57 is able to maintain the first position, second position, and third position described earlier within a prescribed range (the range of rotation of the cam member 57).

Now, when selecting the desired viewing visibility, matching the projection 59a and index mark 63a of the visibility adjustment operating dial 59 with one of the index marks 63b on the rear cover 1b, as will be described subsequently, it is necessary to precisely match the position of the index marks 63b with the turning position of the visibility adjustment operating dial 59 and the cam member 67, making it necessary to raise the precision of the various components as well as the assembly precision, which leads to manufacturing difficulties.

That being so, in the visibility adjustment mechanism of the finder unit in this embodiment, provision is made so that the visibilities corresponding to the positions of the eyepiece lens 57 set when the projection 66b of the click spring 66 contacts the valleys in the click cam piece 65 are not displaced within a prescribed range. Accordingly, when the projection 59a and the index mark 63a is matched with one of the index marks 63b on the rear cover 1b, the position of the eyepiece lens 57 can take the prescribed first position, second position, or third position, even when the turning position of the cam member 67 is slightly displaced.

Figure 16:
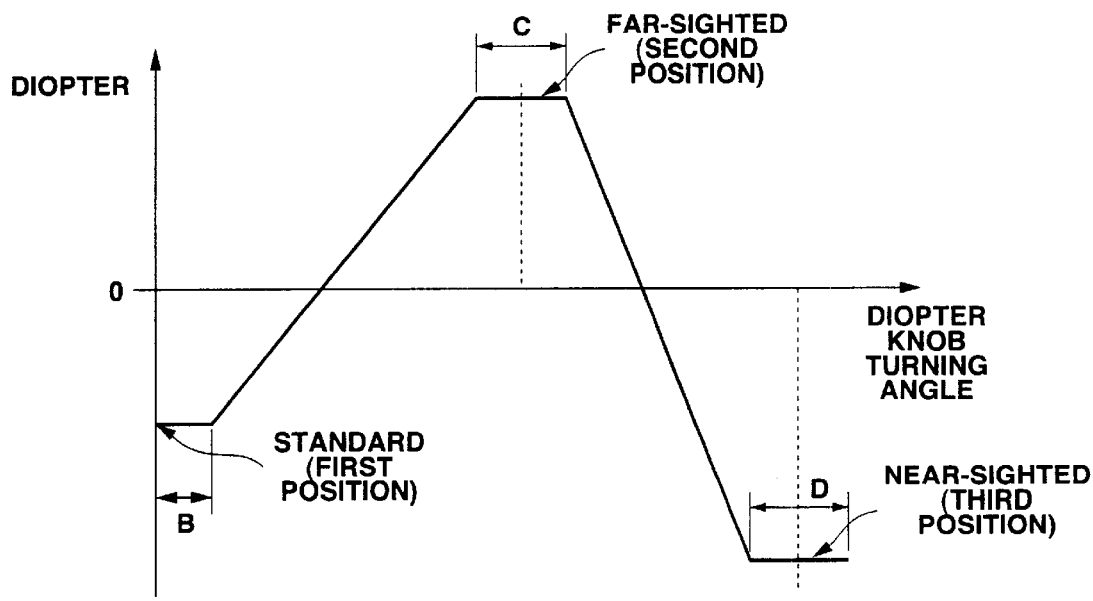
FIG. 16 is a diagram representing viewing visibility displacement in the visibility adjustment mechanism shown in FIG. 13.

In other words, in the visibility adjustment mechanism of the finder unit in this embodiment, the displacement of the viewing visibility effected by manipulating the visibility adjustment operating dial 59 is set according to the cam shape of the cam surface 67c of the cam member 67 diagrammed in FIG. 16.

FIG. 16 is a diagram that represents displacements in the viewing visibility in the visibility adjustment mechanism of the finder unit in this embodiment. As diagrammed in FIG. 16, at the first position corresponding to a person with normal vision of the eyepiece lens 57, the viewing visibility will be maintained within the prescribed range indicated by the symbol B. After that, the viewing visibility is gradually displaced by manipulating the visibility adjustment operating dial 59, and the viewing visibility corresponding to the second position corresponding to a far-sighted person is set. At that time, before the projection 66b of the click spring 66 contacts a valley in the click cam piece 65, a viewing visibility corresponding to the second position will be set, and that viewing visibility will be maintained within the prescribed range indicated b the symbol C.

Then, when the visibility adjustment operating dial 59 is manipulated further, the viewing visibility will gradually be displaced, and a viewing visibility corresponding to the third position corresponding to a near-sighted person will be set. At this time, similarly, before the projection 66b of the click spring 66 contacts a valley in the click cam piece 65, the viewing visibility corresponding to the third position will be set, and the viewing visibility will be maintained within the prescribed range indicated by the symbol D.

Furthermore, in the camera 1 wherein the finder unit of this embodiment is employed, display means are provided that, when the eyepiece lens 57 is set in a prescribed first position, second position, or third position, as described in the foregoing, indicate that fact. These display means are configured by the index marks 63b corresponding to the various positions, described earlier, provided on the rear cover 1b and by the projection 59a and index mark 63a formed on the visibility adjustment operating dial 59. That is, the configuration is such that, by matching the projection 59a and index mark 63a on the visibility adjustment operating dial 59 with one of the index marks 63b on the rear cover 1b, the eyepiece lens 57 will be set in one of the prescribed positions, i.e. the first position, second position, or third positon.

Furthermore, in the visibility adjustment mechanism in the finder unit in this embodiment, the position of the visibility adjustment operating dial 59 corresponding to the viewing visibility for the first position (symbol B in FIG. 16) corresponding to a person with normal vision will be the "Normal" position indicated in FIG. 11. This position will be at one end of the range wherein the visibility adjustment operating dial 59 can be turned.

Also, the visibility adjustment operating dial 59 corresponding to the viewing visibility (symbol C in FIG. 16) of the second position corresponding to far-sighted persons will become the "eye glasses 1" position indicated in FIG. 11.

And the visibility adjustment operating dial 59 corresponding to the viewing visibility (symbol D in FIG. 16) of the third position corresponding to near-sighted persons will become the "eye glasses 2" position indicated in FIG. 11. This position is at the other end of the range within which the visibility adjustment operating dial 59 can be turned.

Thus, in the configuration of the finder unit in this embodiment, a visibility adjustment mechanism is comprised which moves the eyepiece lens 57 in a direction extending along the optical axis of the finder optical system and displaces the viewing visibility. Accordingly, the intervals (distances) between the image formation position for the viewing image formed by the objective optical system (position indicated by the symbol A in FIG. 3A, 3B, and 3C and in FIG. 12A, 12B, and 12C) and the second prism 55 and third prism 56, respectively, are set so that, even when the eyepiece lens 57 is moved by the visibility adjustment mechanism, the visibility difference between the viewing image and the output surface of the second prism 55 and the visibility difference between the viewing image and the input surface of the third prism 56 are always at least larger than 4 diopters (1/m).

That is, in the finder unit in this embodiment, the image formation position of the viewing image formed by the objective optical system (position indicated by symbol A in FIG. 12A, 12B, and 12C) is set so that both of the following conditional expressions, namely $$4+X1 < 1000 \times D1/f^2,$$

and $$4+X2 < 1000 \times D2/f^2$$

are satisfied, where:

f (mm) is the focal length of the eyepiece optical system;

D1 (mm; cf. FIGS. 12A, 12B, and 12C) is the distance from the viewing image formation position to the second prism 55 (first optical component);

D2 (mm; cf. FIGS. 12A, 12B, and 12C) is the distance from the viewing image formation position to the third prism 56 (second optical component);

X1 (1/m; cf. FIGS. 12A, 12B, and 12C) is the adjustment amount on the visibility minus side of the visibility adjustment means comprising the visibility adjustment operating dial 59 and the cam member 67; and X2 (1/m; cf. FIGS. 12A, 12B, and 12C) is the adjustment amount on the visibility plus side of the visibility adjustment means.

In other respects, the configuration is substantially the same as in the first embodiment aspect described earlier.

The action of the visibility adjustment mechanism in this finder unit will be as follows.

First, when the eyepiece lens 57 is set in the first position, that is, in a condition wherein the projection 59a and index mark 63a on the visibility adjustment operating dial 59 are set in the "Normal" position indicated by the index marks 63b on the rear cover 1b, the viewing visibility is in a condition corresponding to a person with normal vision. At such time, the projection 66b on the click spring 66 is situated at the "standard position" indicated in FIG. 15.

In this condition, a user of this camera 1 turns the visibility adjustment operating dial 59 in a clockwise direction as viewed from the back surface side of the camera 1. Thereupon, the cam member 67 and the click spring 66 will begin to turn along with the turning of the visibility adjustment operating dial 59, in the same direction.

At such time, the projection 66b on the click spring 66 will be moved from a valley in the click cam piece 65 toward a ridge therein, against its own elastic force. Simultaneously therewith, the cam member 67 will move the eyepiece lens 57 via the support arm 57b, toward the position indicated by the broken lines in FIG. 14, according to the setting of the cam follower 57c. Then, when the projection 59a and index mark 63a on the visibility adjustment operating dial 59 are set at the "eye glasses 1" position indicated by the index marks 63b on the rear cover 1b, and the user releases the force wherewith he or she is turning the visibility adjustment operating dial 59, the projection 66b on the click spring 66 is situated in the "far-sighted position" indicated in FIG. 15, and that position is maintained by the action of the click mechanism. At that time, the visibility adjustment operating dial 59 is moved to the second position that constitutes the viewing visibility corresponding to a far-sighted person, and the position of the visibility adjustment operating dial 59 is also held in this position.

When, from this condition, the user further turns the visibility adjustment operating dial 59 in a clockwise direction as seen from the back surface side of the camera 1, the cam member 67 and the click spring 66 are turned along with the turning manipulation of the visibility adjustment operating dial 59, in the same direction, and a displacement is effected from the "second position" to the "third position."

In this manner the viewing visibility is displaced in stages from the "Normal" position to the "second position" corresponding to a far-sighted person, and from the "second position" corresponding to an far-sighted person to the "third position" corresponding to a near-sighted person.

Based on this second embodiment, as described in the foregoing, the same benefits can be realized as with the first embodiment, described earlier, even in a finder unit equipped with a visibility adjustment mechanism.

Also, the configuration is made so that the respective intervals between the image formation position, on the one hand, and the output surface 55k of the second prism 55 and the input surface of the third prism 56, on the other, are separated by a prescribed distance, wherefore constantly good viewing images can be viewed while providing a visibility adjustment mechanism in an real-image type finder unit.

Further, in the second embodiment aspect described in the foregoing, the configuration is made so that the viewing visibility, which can be adjusted by turning the visibility adjustment operating dial 59, is displaced in stages in the order of a first position corresponding to a person with normal vision, a second position corresponding to a far-sighted person, and a third position corresponding to a near-sighted person. Without being limited thereto, however, the direction of displacement may be set differently so that displacement is effected from a first position corresponding to a person with normal vision toward the minus direction of the viewing visibility to a position corresponding to a near-sighted person (which will be made the second position in this case), and displacement is then made in the plus direction of the viewing visibility to a position corresponding to a far-sighted person (which will be made the third position). In that case, merely by suitably altering the cam shape of the cam surface 67c of the cam member 67, various displacement forms can easily be managed.

In this invention, it is evident that different embodiment aspects, over a wide range, can be configured, based on the invention, without departing from the spirit or exceeding the scope of the invention. This invention, except insofar as limited by the attached claims, is not restricted by specific embodiment aspects thereof.

What is claimed is:

1. A finder unit comprising:
   a finder optical system having an objective optical system for forming a viewing image and an eyepiece optical system for viewing said viewing image, and including an inverting optical system for making the viewing image formed by said objective optical system an erecting normal image;
   a visibility adjustment mechanism for adjusting viewing visibility of said viewing image within a prescribed range;
   a first optical component which forms a part of said objective optical system and which is provided closer to said objective optical system such that it is distant from the image formation position for said viewing image by a predetermined length; and
   a second optical component which forms a part of said is eyepiece optical system and which is provided closer to said eyepiece optical system such that it is distant from the image formation position for said viewing image by a predetermined length;
   wherein both conditions are expressed by $$4+X1<1000\times D1/f^2,$$

and $$4+X2<1000\times D2/f^2$$

are satisfied, where f (mm) represents a focal length of said eyepiece optical system, D1 (mm) represents a distance from image formation position for said viewing image to an optical surface of said first optical component on the side of the image formation position for said viewing image, D2 (mm) represents a distance from image formation position for said viewing image to an optical surface of said second optical component on the side of the image formation position for said viewing image, X1 (1/m) represents an amount of adjustment toward visibility minus side of said visibility adjustment mechanism, and X2 (1/m) represents an amount of adjustment for increasing the visibility of said visibility adjustment mechanism.

2. The finder unit according to claim 1, wherein the focal length f of said eyepiece optical system also satisfies the condition of 10<f<20 (mm).

3. The finder unit according to claim 2, wherein said inverting optical system has a first reflecting surface, second reflecting surface, and third reflecting surface, which are closer to said objective optical system than the image formation position for said viewing image, and a fourth reflecting surface which is closer to said eyepiece optical system than the image formation position for said viewing image.

4. The finder unit according to claim 3, wherein said fourth reflecting surface is a translucent reflecting surface, having light measuring means deployed on an extension of the optical axis of light incident at said fourth reflecting surface.

5. The finder unit according to claim 3, wherein said fourth reflecting surface is a translucent reflecting surface, having a display mechanism deployed on an extension of the optical axis of light reflected from said fourth reflecting surface.

6. The finder unit according to claim 3, wherein said fourth reflecting surface is a translucent reflecting surface, and comprises:
   a light measuring element deployed on an extension of the optical axis of light incident at said fourth reflecting surface; and
   a display mechanism deployed on an extension of the optical axis of light reflected from said fourth reflecting surface.

7. The finder unit according to claim 2, further comprising a light measuring element for measuring light using light from said objective optical system, wherein said inverting optical system has at least one translucent reflecting surface, and, of light from said objective optical system, that transmitted light transmitted through said translucent reflecting surface is transferred to said light measuring element.

8. The finder unit according to claim 2, further comprising a display mechanism for indicating a viewable indication superimposed on said viewing image.

9. The finder unit according to claim 1, wherein the condition of $D1 \leq D2$ (mm) is satisfied.

10. The finder unit according to claim 1, further comprising a display mechanism for indicating a viewable indication superimposed on said viewing image.

11. The finder unit according to claim 10, wherein said inverting optical system has a first reflecting surface, second reflecting surface, and third reflecting surface, which are closer to said objective optical system than the image formation position for said viewing image, and a fourth reflecting surface which comprises a translucent reflecting surface and is closer to said eyepiece optical system than the image formation position for said viewing image; and wherein said display mechanism is deployed on an extension of the optical axis of light flux reflected from said fourth reflecting surface.

12. The finder unit according to claim 11, wherein said display mechanism has a display member having a light transmitting site, and further comprises:

a natural illumination member that intakes natural light for illuminating said light transmitting site of said display member by natural light from outside the finder unit; and an electrical light emitting element for illuminating said light transmitting site of said display member.

13. The finder unit according to claim 1, wherein said inverting optical system has a first reflecting surface, second reflecting surface, and third reflecting surface, which are closer to said objective optical system than the image formation position for said viewing image, and a fourth reflecting surface which is closer to said eyepiece optical system than the image formation position for said viewing image.

14. The finder unit according to claim 13, further comprising a display mechanism for indicating a viewable indication superimposed on said viewing image.

15. The finder unit according to claim 14, wherein said fourth reflecting surface is a translucent reflecting surface, and said display mechanism is deployed on an extension of an optical axis of light reflected from said fourth reflecting surface.

16. The finder unit according to claim 15, wherein said display mechanism has a display member having a light transmitting site, and further comprises:

a natural illumination member that intakes natural light for illuminating said light transmitting site of said display member by natural light from outside finder unit; and an electrical light emitting element for illuminating said light transmitting site of said display member.

17. The finder unit according to claim 15, having a light measuring element for measuring light based on transmitted light transmitted through said fourth reflecting surface.

* * * * *